United States Patent [19]

Menendez et al.

[11] Patent Number: 5,555,369
[45] Date of Patent: Sep. 10, 1996

[54] METHOD OF CREATING PACKAGES FOR A POINTER-BASED COMPUTER SYSTEM

[75] Inventors: Norberto Menendez, San Jose; Peter J. Potrebic, Mtn. View; Benjamin W. Sharpe, San Francisco, all of Calif.

[73] Assignee: Apple Computer, Inc., Cupertino, Calif.

[21] Appl. No.: 195,939

[22] Filed: Feb. 14, 1994

[51] Int. Cl.6 .................................................. G06F 3/14
[52] U.S. Cl. ........................ 395/161; 395/155; 395/157; 395/159
[58] Field of Search ........................... 395/155, 156, 395/157, 159, 160, 161, 200, 500, 600, 700, 50

[56] References Cited

U.S. PATENT DOCUMENTS

| | | | |
|---|---|---|---|
| 5,301,270 | 4/1994 | Steinberg et al. | 395/161 |
| 5,317,732 | 5/1994 | Gerlach, Jr. et al. | 395/600 |
| 5,339,433 | 8/1994 | Frid-Nielsen | 395/700 |
| 5,412,756 | 5/1995 | Bauman et al. | 395/50 |

OTHER PUBLICATIONS

O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Sep. 1992, Popular Science Magazine.
Promotional Literature regarding "Object Master" from ACIUS, Inc., Frame Works, pp. 12–15, Sep./Oct. 1993.

*Primary Examiner*—Mark R. Powell
*Assistant Examiner*—Ruay Lian Ho
*Attorney, Agent, or Firm*—Hickman, Beyer & Weaver

[57] ABSTRACT

A development environment and method is provided in which a first computer system is used to develop an application for execution in a second computer system—such as a pen-based computer—having a graphical user interface. The first computer system also has a graphical user interface that can display (1) a palette containing lists and/or buttons of "components" representing graphical interface elements such as slide bars, dialog boxes, buttons, check boxes, icons, menus, etc., (2) a layout window corresponding a display screen of the second computer and containing "views" of selected palette components and (3) a browser allowing the views to be edited graphically. To develop an application, the user creates views on the layout window by (1) selecting a component from the palette and (2) drawing a border for the view in the layout window. Each view so created represents a "template" which is a frame object having a plurality of "slots" which may be edited in a slot editor area of the browser. Some views in the layout window may be "linked views" which point to sublayout windows containing a plurality of other views. Still further, a system is provided that allows the creation of user defined proto templates containing an arrangement of views defined by the user. The user-defined proto templates can be used to create views in the layout window as described above.

31 Claims, 19 Drawing Sheets

METHOD OF CREATING PACKAGES FOR A POINTER-BASED COMPUTER SYSTEM

BACKGROUND OF THE INVENTION

The present invention relates generally to methods and apparatus for preparing applications and other material for use in pointer-based computer systems such as pen-based computers. More specifically, the invention relates to graphical methods and apparatus for preparing "packages" used by a pointer-based computer for routing data and/or applications.

A pen-based computer is a small, often hand-held, computer system in which the primary method for inputting data includes a "pen" or stylus. A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computers as a computerized notepads. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion. Once input into the pen-based computer, the information can be manipulated in much the same manner as information input into conventional computer systems. One commercially-available pen-based computer, the "Newton" from Apple Computer, Inc., Cupertino, Calif., employs "packages" of data having defined structures to route applications and data used by applications and utilities throughout the system.

Pen-based computer systems have many uses: they can be used to jot down notes at meetings, organize to-do lists, send and receive information by faxing, electronic mail, etc. These functions can be accomplished with the aid of graphical interface elements such as slide bars, buttons, check boxes, icons, menus, etc. Because these computer systems are intended to be flexible tools suitable for use by a wide range of users, it would be desirable if the user/developer could quickly and easily construct his or her own application incorporating standard graphical elements. This would be especially desirable in pen-based computer systems which recognize handwritten instructions and allow the user to scribble handwritten notes and interact with "live" screens which might be incorporated into the applications.

Some high-level environments are available to assist developers in preparing and debugging applications for computers having conventional graphical user interfaces. In some of these environments, the user is provided with a "browser" which is a window containing lists from which the developer can select a desired graphical interface element to edit and/or modify in an editing region of the browser. An example of one such system is the "Object Master" available from Acius which is used for developing high-level applications for the Macintosh computer (Apple Computer, Inc., Cupertino, Calif.). Typically, only text can be edited in the browsers available in such development environments. Thus, development of a graphical interface-based program—such as those useful for many pen-based computers—can be quite tedious.

The same development environments sometimes include "layout windows" representing the display screen of a computer in which the application under development will execute. The developer can incorporate representations of various graphical interface elements (such as the buttons, check boxes, dialog boxes, etc. mentioned above) in the layout window. Unfortunately, such layout windows can become quite cluttered during the development of complicated applications.

In view of the above shortcomings of existing development environments, it would be desirable to have a development environment in which the user had considerable flexibility to prepare complicated graphical user interfaces for, e.g., pen-based computer applications.

SUMMARY OF THE INVENTION

The present invention provides a development environment and method in which a first computer system is used to develop and package an application (or other material) for use in a second computer system—preferably a pen-based computer—having a graphical user interface. The first computer system will also have a graphical user interface that can display a layout window and browser as described above, and, in addition, a palette containing lists and/or buttons of "components" representing graphical interface elements such as slide bars, dialog boxes, buttons, check boxes, icons, menus, etc. To develop an application, the user creates "views" on the layout window by (1) selecting a component from the palette and (2) drawing a border for the view in the layout window. Each view so created represents a "template" which is an object (sometimes referred to as a "frame" herein) having a plurality of "slots" defining the structure and behavior of the graphical interface element associated with the view. The browser is used to edit and create new slots when a user selects a desired view and slot and then graphically edits the slot in a slot editor area of the browser. In addition, the invention allows creation of "linked views" in which a main or first layout window is coupled to a second or "sub" layout window. Like the main layout window, the second layout window contains a plurality of views. Still further, the invention allows the creation of user-defined proto templates containing an arrangement of views defined by the user and selectable from the palette. The user-defined proto templates can be used to create views in the layout window as described above.

In one aspect, the invention provides a specific method of using "linked views" in the first computer system to create an application that can be executed and displayed on the second computer system. It should be noted that the second computer system has a display screen sensitive to a pointer, a processor in communication with the display screen, and a memory in communication with the processor such that when the application is executing on the processor it can perform defined actions in response to interaction of the pointer with the display screen. The method includes the following steps: (1) displaying a first layout window on the display screen of the first computer system; (2) displaying a plurality of predefined views on the first layout window, each such predefined view defining a graphical interface element appearing on the display screen of the second computer system when the application is executing, the predefined views being located at regions of the first layout window corresponding to the locations of graphical interface elements appearing on the display screen of the second computer system when the application is executing; (3) linking a second layout with a view in the first layout window, the second layout itself having a plurality of predefined views defining graphical interface elements; and (4) building the application from views on the first and second layouts. Linked views have the advantage of allowing the application to be divided into various logical modules, each defined by a separate layout window. This prevents the primary layout window from becoming unduly cluttered during development of complicated applications.

In another aspect, the invention provides a method of creating an application including steps of displaying a layout window on the display screen of a first computer system and displaying a plurality of views on the layout window as described above. In addition, this aspect of the invention includes a step of displaying on the display screen of the first computer system a "browser" listing the views in the layout window. As noted, each such view represents a "template" (which is a frame object) having a plurality of "slots" defining the structure or behavior of the view. The browser also lists the slots of a selected view and has a slot editor area which can display a graphical representation of a selected slot from the selected view. A slot selected from the list of slots in the browser is modified in the slot editor area in response to editing commands performed on the graphical representation of the selected slot. In preferred embodiments, the slot editor area changes format depending upon the type of slot being edited. For some slots, the slot editor may present a series of check boxes, while for other slots, the slot editor may present pop-up menus, radio buttons, etc. When the all desired slot editing is concluded, the application is built from views on the layout window.

In yet another aspect, the invention provides a method of creating an application employing a user-defined proto template. The method includes the following steps: (1) displaying a proto layout window on the display screen of a first computer system, the proto layout window defining a representation of at least a portion of the display screen of a second computer system (on which the application will execute); (2) displaying a user-defined arrangement of views on the proto layout window, each such predefined view representing a component available from a palette displayed on the first computer system and each predefined view defining a graphical interface element appearing on the display screen of the second computer system when the application is executing; (3) creating a new proto template which defines the user-defined arrangement of views on the proto layout window, the new proto template being selectable from the palette and functioning as a predefined view; (4) displaying a main layout window on the display screen of the first computer system, the main layout window defining a representation of the display screen of the second computer system; (5) displaying a view of the new proto template on the main layout window on the display screen of the first computer system; and (6) building the application from the views on the main layout window. The user-defined proto templates of this invention allow frequently used groups of views to be easily and repeatedly applied to layout windows in an application under development.

Still further, the invention provides a method of using a first computer system for preparing a "package" for use in routing data parts associated with an application to various locations in a pointer-based computer system (a second computer system). In preferred embodiments, the package contains an application having a hierarchy of views, some of which may be system-defined and others of which may be user-defined, composed by a developer. The method includes the following steps: (1) identifying application files from a collection of files; (2) recursively processing the views from the application files such that the views are converted to data parts that are incorporated into the package.

These and other features and advantages of the present invention will be presented in more detail in the following specification of the invention and the several figures.

DETAILED DESCRIPTION OF THE PREFERRED EMBODIMENTS

I. GENERAL

The graphical interface applications and other material prepared and packaged according to the present invention are well suited for use in pointer based computer systems such as the pen-based, pen-aware, and mouse controlled systems that are currently popular. For the purposes of illustration, the invention will be described in connection with a pen-based system.

Figure 1:
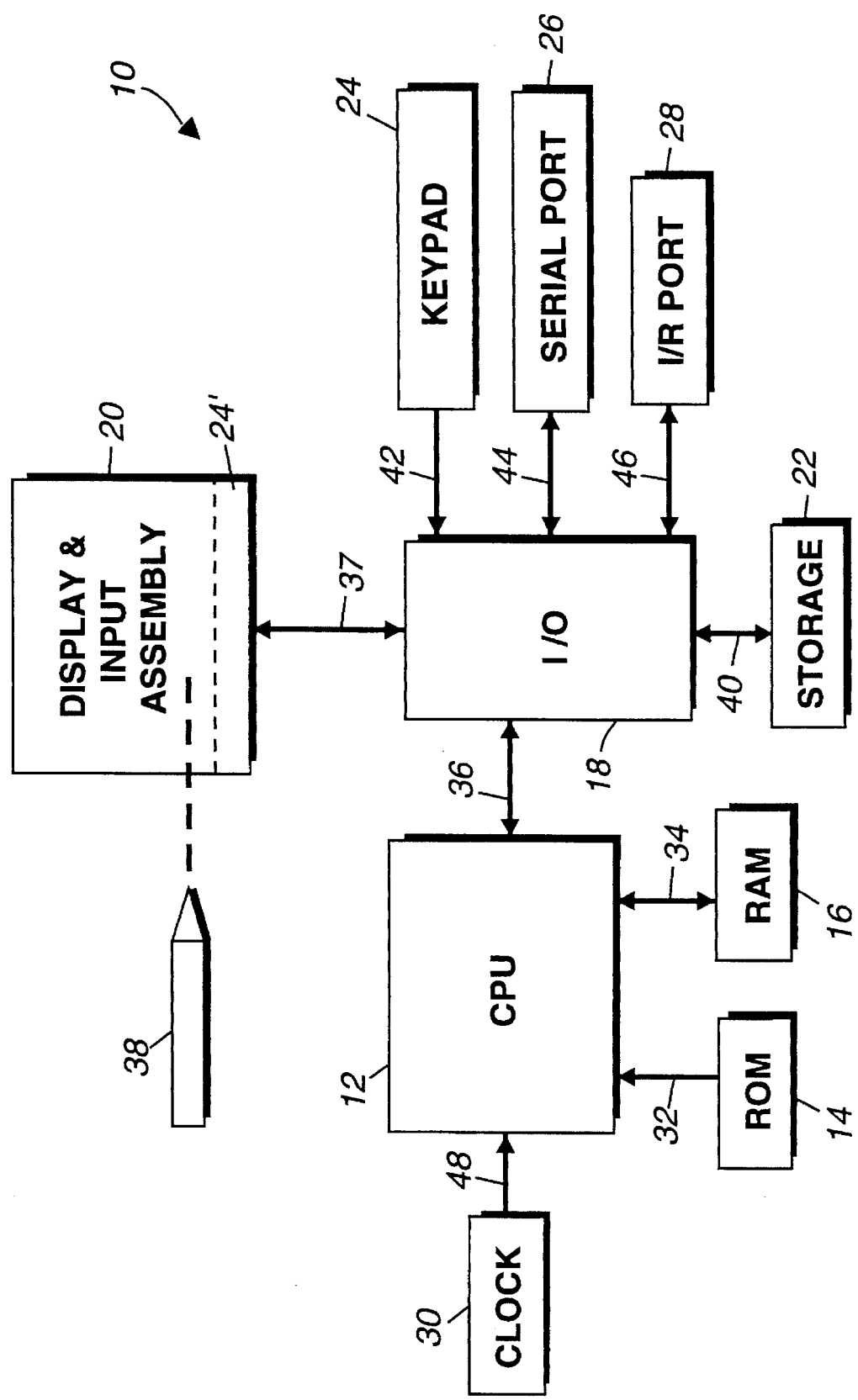
FIG. 1 is a block diagram of a pen-based computer system in accordance with the present invention.

FIG. 1 shows a pen-based computer system 10 suitable for running an interactive application of this invention. The computer system used to prepare the application may be computer system 10, but typically a different computer system—which may not be a pen-based computer system—is used to prepare the application. Generally, the computer used for preparation includes many of the same elements shown in FIG. 1, but need not contain, for example, a stylus 38. Although many types of personal computers (or mainframe computers or hand-held computers) may be used to prepare the applications in accordance with this invention, a particularly preferred computer is a Macintosh computer made by Apple Computer Inc., of Cupertino Calif.

As shown in FIG. 1, the pen-based computer system 10 includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also commercially available. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
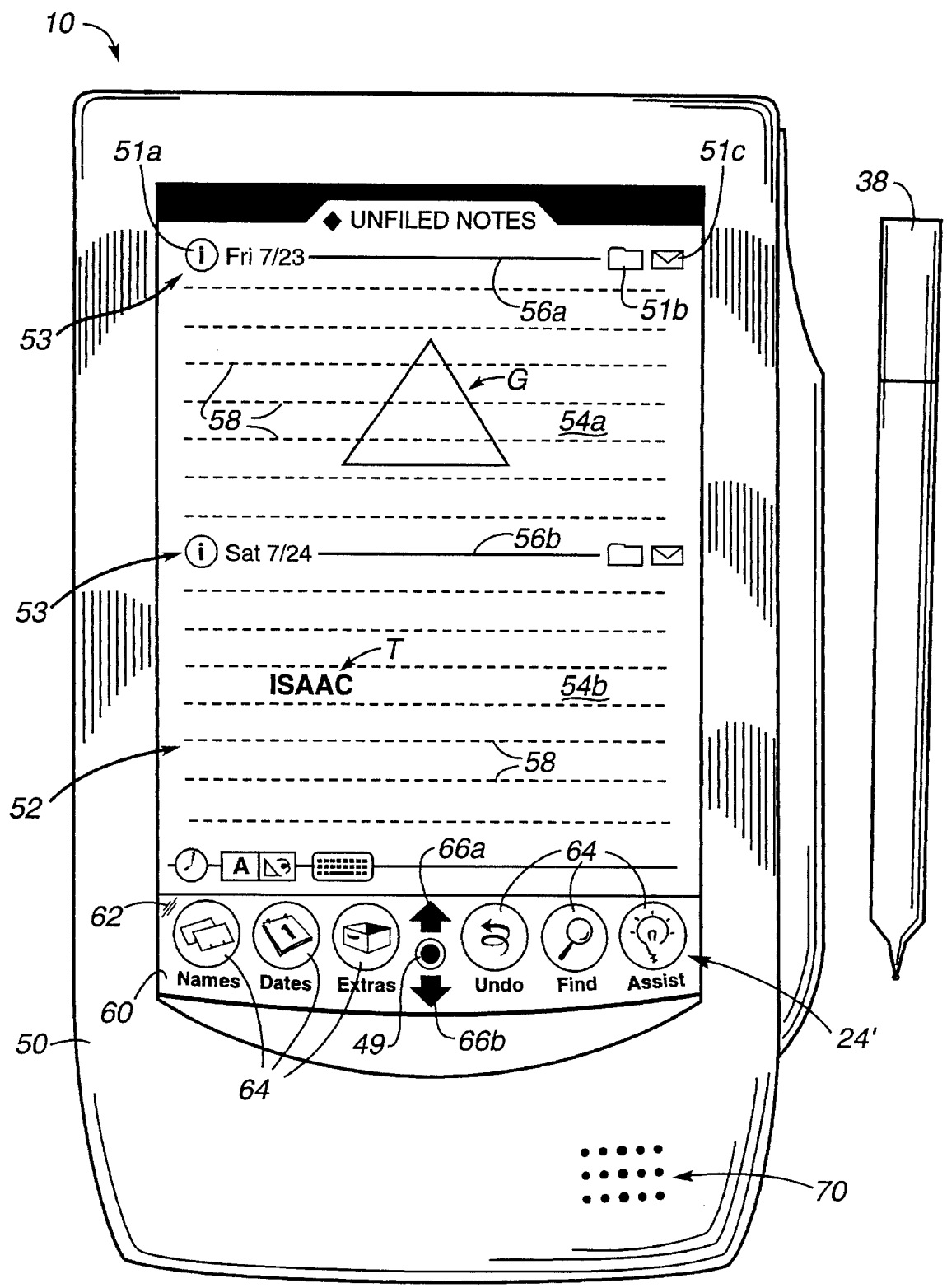
FIG. 2 is a pictorial representation of the screen of a computer display assembly of the present invention.

The keypad 24' can comprise an array of mechanical buttons or switches coupled to I/O circuitry 18 by a data bus 42. Alternatively, keypad 24' can comprise an entire, standard QWERTY keyboard. In the present embodiment, a separate keypad 24' is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silkscreened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 30 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

Upon power-up, pen based computer system 10 displays on screen 52 an initial "note" area 54a including a header 53 and a number of guidelines 58. The header 53 preferably includes a header bar 56a, the date of creation of the note area 54a, and one or more icons and "soft" dedicated header function buttons 51A, 51B, and 51C. The optional guidelines 58 aid a user in entering text, graphics, and data into the pen-based computer system 10. A graphic object G in the form of a triangle is shown entered within note area 54a.

Additional note areas, such as a note area 54b, can be formed by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64, an "overview button" 49, and a pair of scroll buttons 66a and 66b. The function buttons 64 include an address button ("Names"), a calendar button ("dates"), a drawer button ("extras"), an undo button, a find button, and an assist button. The operation of the note areas 54a, 54b, etc., scroll buttons 66a and 66b, and other aspects of computer system 10 are discussed in greater detail in U.S. patent application Ser. No. 07/868,013, filed Apr. 13, 1992, and U.S. patent application Ser No. 08/127,211, filed on Sep. 24, 1993 and entitled "Method for Manipulating Notes on a Computer Display," both of which name Tchao et al. as inventors, are assigned to the assignee of the present invention and are incorporated herein by reference in its entirety.

A status bar 68 is provided at the bottom of the notepad application. The status bar 68 may be provided with a number of active and display areas. For example, U.S. patent application serial number Ser. No. 07/976,970 filed Nov. 16, 1992 on behalf of Foster et. al, entitled "Status Bar for Application Windows" and assigned to the assignee of the present invention describes how to make and use the status bar for certain applications (e.g., a notepad application), and is incorporated herein by reference in its entirety.

The "Find" button is used to initiate a search for information. The undo button will undo the latest user action when depressed and will undo the last two actions if depressed a second time without the intervention of any additional user actions. The assist button gives the user access to a help menu which is designed to provide operating instructions to the user that may be helpful when the user is unsure of how to operate the computing system.

Figure 3:
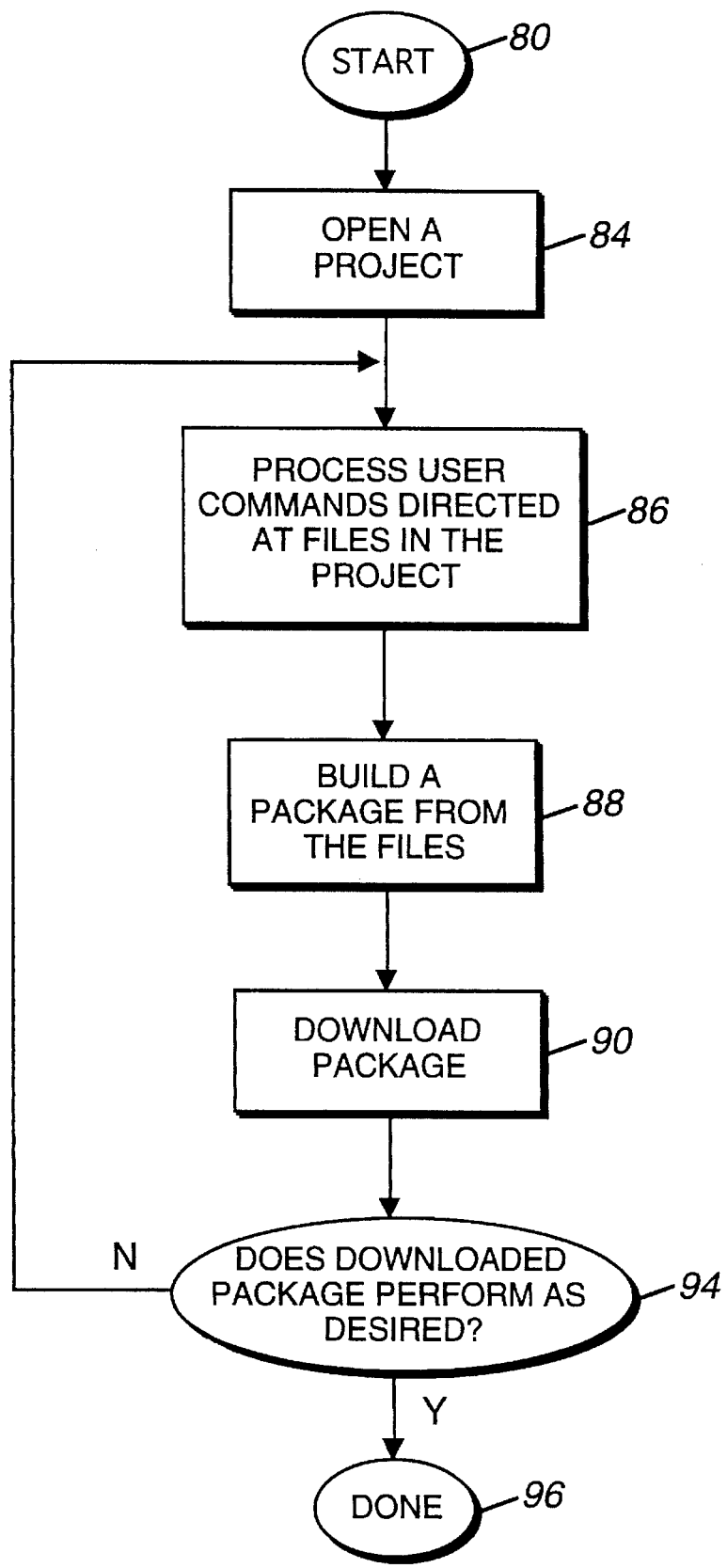
FIG. 3 is a process flow diagram of the general steps employed in accordance with this invention to prepare a package for use in a pointer-based computer system.

A "drawer", which is opened by pressing the drawer button ("extras") is used to store other application programs, tools, access buttons to external ROM cards, communications applications and other items that can be utilized by the user. When the drawer is "opened", a drawer dialog box 55 is displayed on the screen 52 as shown in FIG. 3. The user can then launch any application stored therein merely by tapping on the associated icon that is displayed within the drawer dialog box. Thus, the icons serve as "soft buttons" which may be activated by tapping the screen at a location corresponding to the displayed position of the icon. Of course, in alternative embodiments, the particular applications that are accessed by keypad buttons can be varied widely. For example, additional keys could be added, existing keys removed, and/or the above described keys could be used to launch different applications.

Preferred embodiments of the present invention employ various "objects." As is well known to software developers, an "object" is a logical software unit comprising data and processes which give it capabilities and attributes. For example, an object can be queried as to its type and can return such data as the number of words that it contains, what its "bounding box" is, etc. Objects can contain other objects of the same or of a different type. Objects can also be used to project images on a screen according to their object type. Example of object types used in the following description include paragraph, line, and word objects. There are many well known texts which describe object oriented programming. See, for example, Object Oriented Programming for the Macintosh, by Kurt J. Smucker, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", Readings in Knowledge Representation, by Brachman and Leveseque, Morgan Kaufman, San Mateo, 1985.

Another preferred tool for implementing the system of the present invention is a "view system." Various types of view systems are well known to those skilled in the art. In the present system, the notepad application on the screen 52 forms a first or "root" layer, with the status bar 68, for example, positioned in a second layer "over" the root layer.

The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

II. EXEMPLARY PREPARATION OF AN APPLICATION

The following overview presents some features of the system of this invention. Specifically, it provides an example of how various graphical interface elements can be positioned and their functions defined by a user (i.e., a person developing the application). As above, the "first computer system" refers to the computer used to prepare an application, while the "second computer system" refers to the computer on which the application runs.

Figure 5:
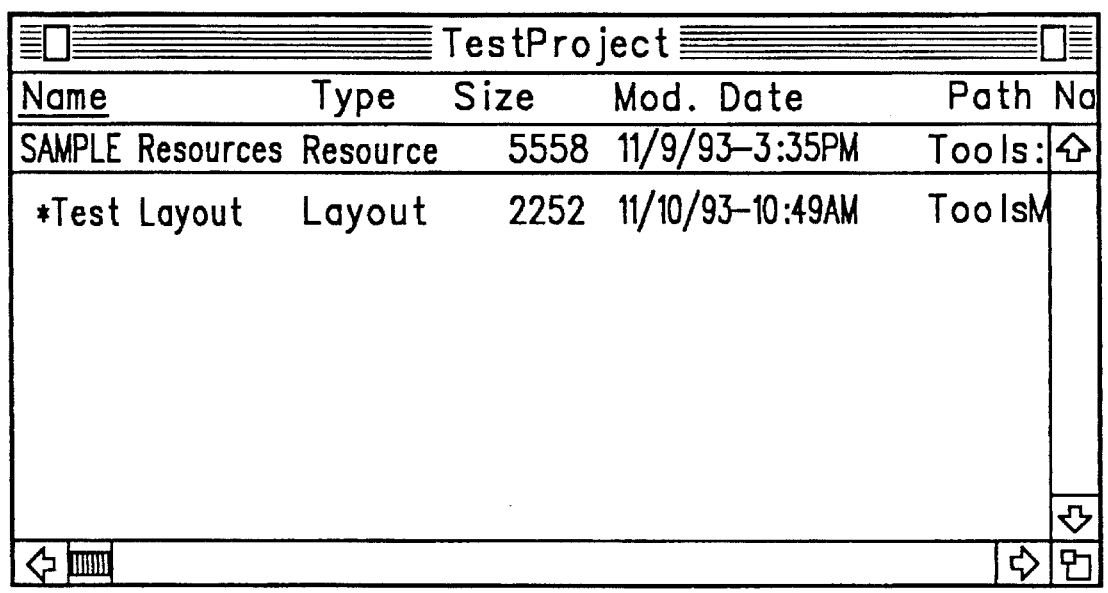
FIG. 5 is an illustration of a project window as it is displayed on a pointer-based computer system used to create the project.

First, the user opens a new "project" by selecting it from a menu displayed on the screen of the first computer system. Most generally, the project contains all the files of a package. A package is a collection of data having a format allowing the second computer system to determine where and how to use the data. For purposes of this example, the project includes only the files used in the application being developed. FIG. 5 shows an exemplary project window 115 as it might appear on the display screen of the first computer system.

Figure 8:
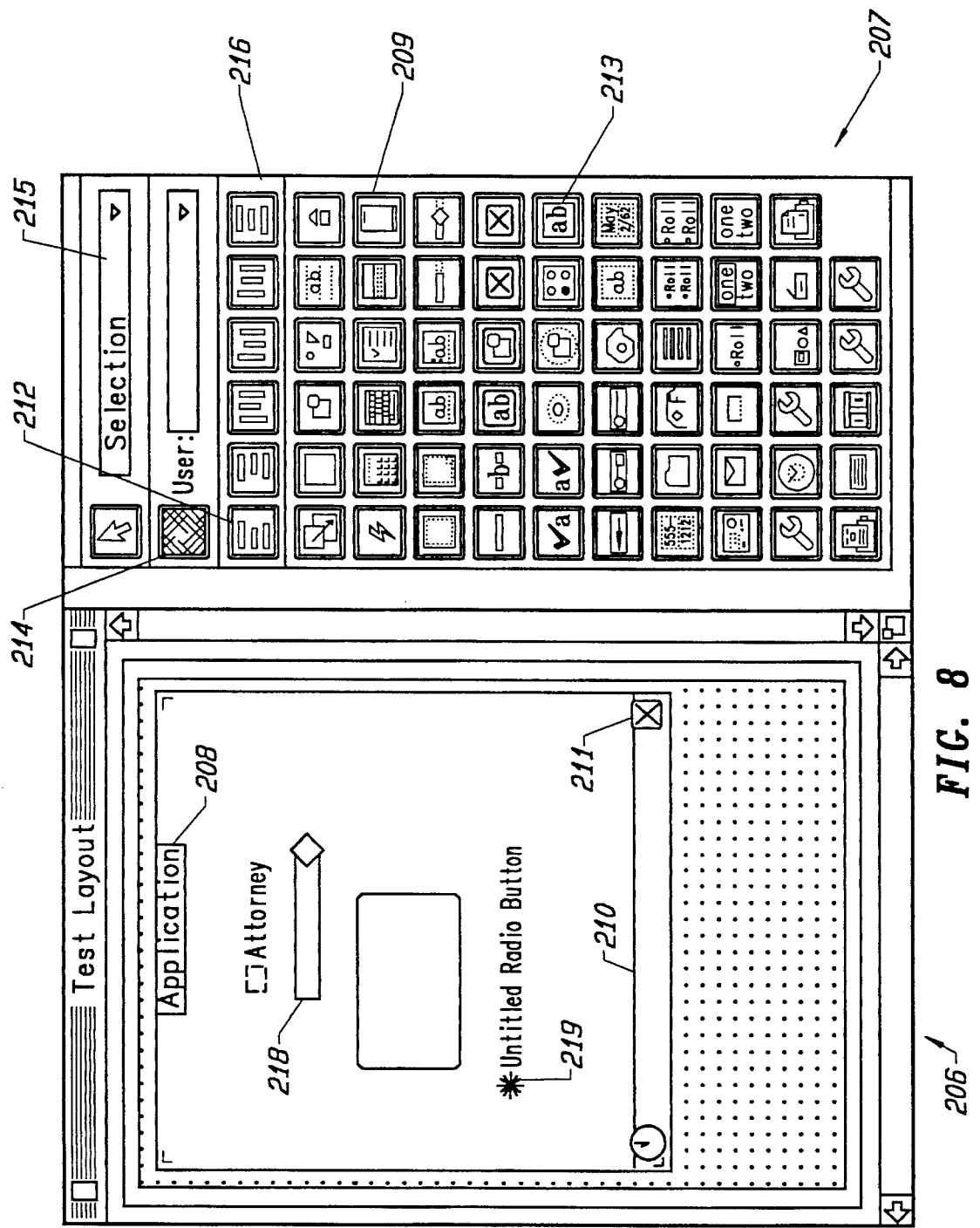
FIG. 8 is an illustration of a palette window containing views used in creating an application and a layout window (in preview mode) used to arrange the views of an application.

Each application contains a "base view" which is the ancestor of all other views in the application. Other views can be developed within one another, and, in this hierarchy, the base view is always located at the top level. A base view is prepared by first opening a new layout (by e.g. selecting "New Layout" from a menu on the computer screen). This will provide a layout window 206 (which is initially blank) and a palette 207 of graphical element components as shown in FIG. 8. The blank layout window represents the screen of the second computer system. The base view is selected from the palette by moving a pointer (e.g., a mouse cursor) over a button (e.g., button 209) for a "protoApp" template and selecting it. This template defines a view that can contain other views and includes a few basic application features such as a title bar 208, a status bar 210, and a close box 211. After the protoApp template has been selected, the user uses the pointer to draw a border of a base view in the layout window. Typically, the border of the base view will occupy nearly all of the layout window. However, base views can be any size up to the size of the layout window. The template associated with the base view is named by opening a "Template Info" dialog box and filling a name in the "Name" field. Then the base view is saved and added to the project by using a pointer to select "Save" and "Add Window" options from appropriate menus on the display screen.

Figure 9:
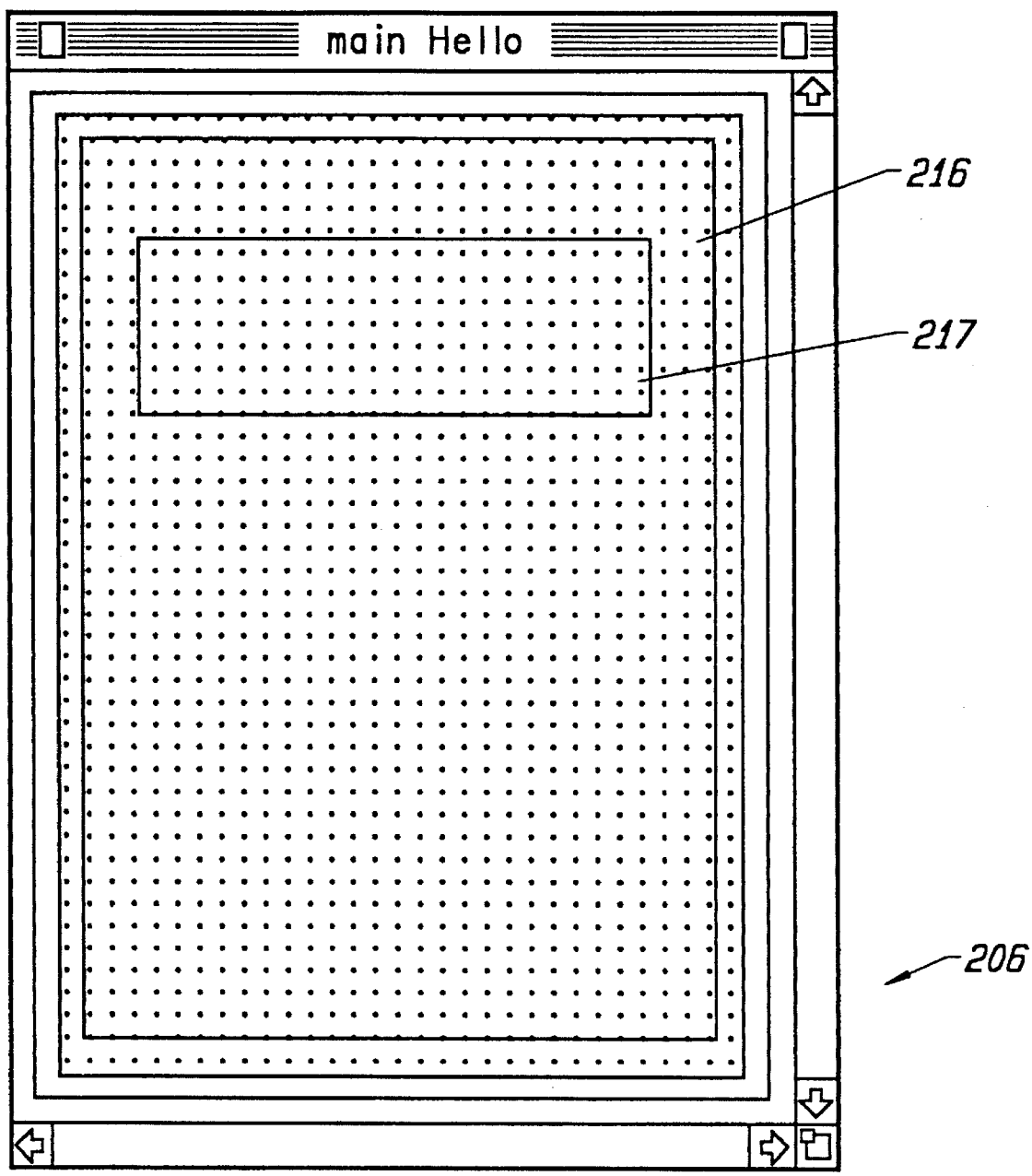
FIG. 9 is an illustration of a layout window in normal mode displaying two views.
Figure 10:
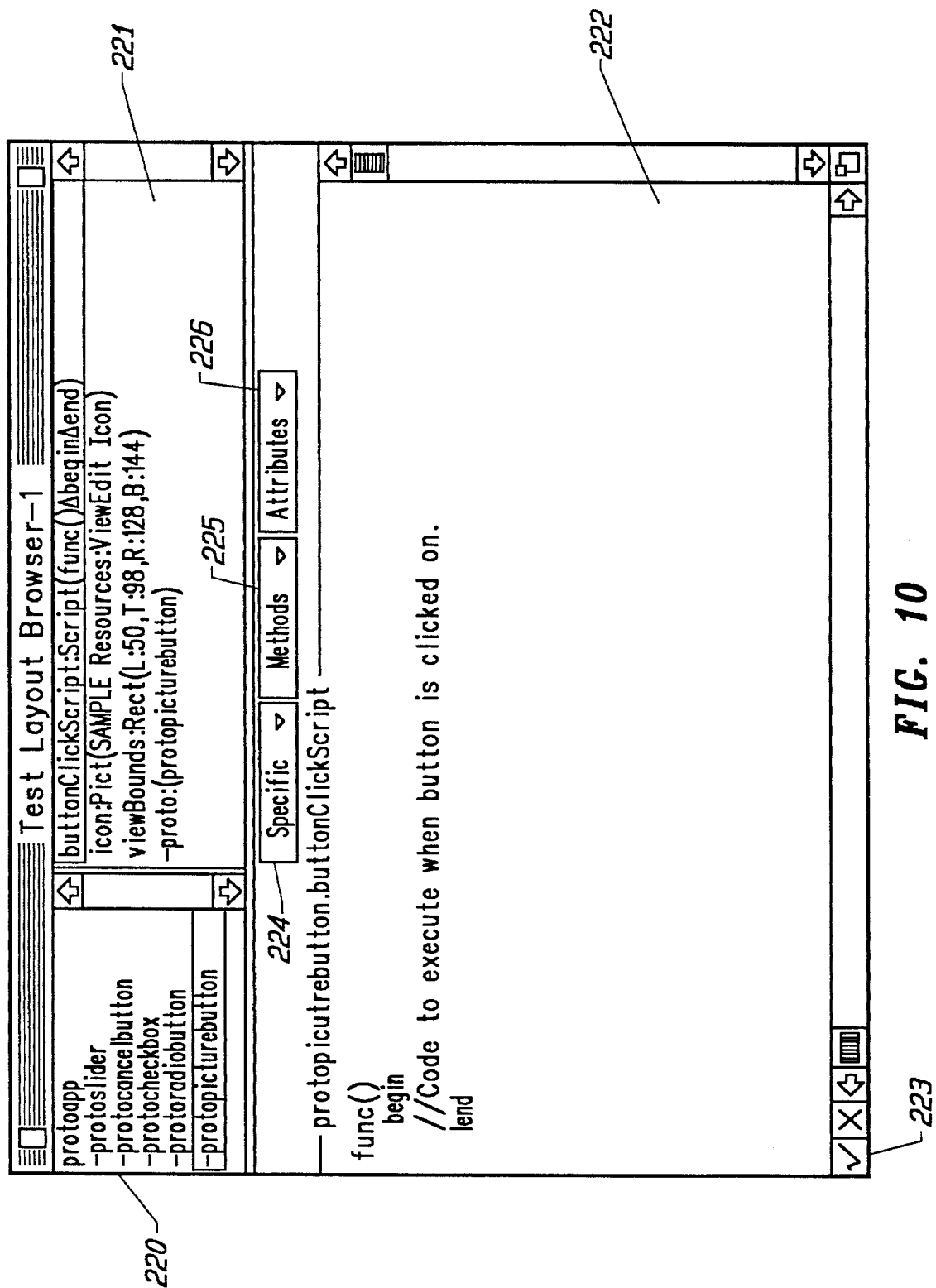
FIG. 10 is an illustration of a browser containing a region for editing the text of a script.
Figure 11:
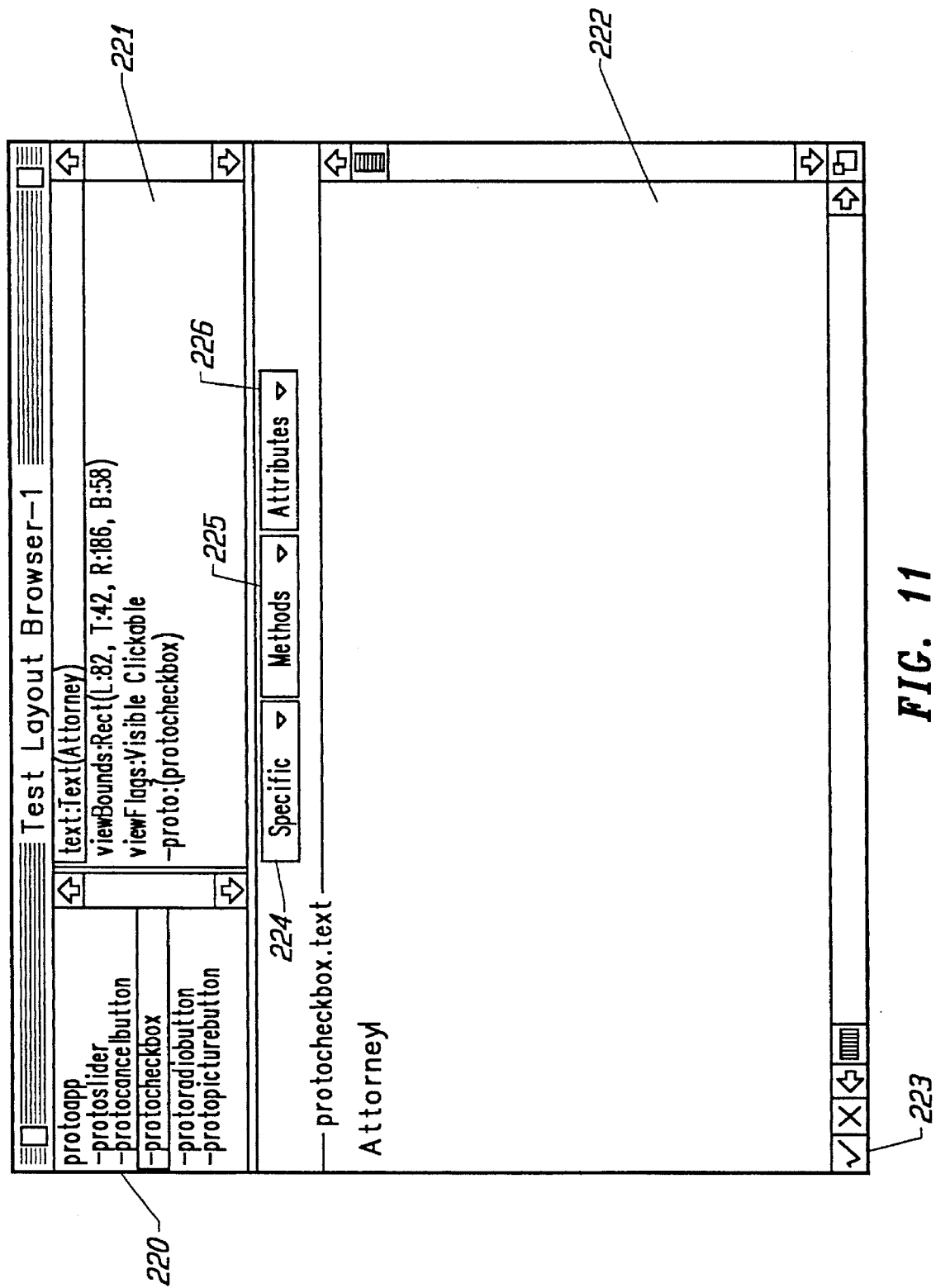
FIG. 11 is an illustration of a browser containing a region for editing a text field of a view.

The actual interface of the application is built by laying out other views within the base view. Text input lines may be added to the interface by selecting a "protoLabelInputLine" from the palette and then drawing out a rectangle inside the larger rectangle defining the border of the base view, as shown in FIG. 9. The size and location of the rectangle associated with the view in the layout window correspond to the size and location of the associated graphical interface element (in this case blank lines for text insertion) appearing in the second computer. Additional views such as those representing buttons, slide bars, etc. may be added in a similar manner.

Views are modified by editing view templates with a browser. This is accomplished by first selecting the view that is to be modified and then bringing up a browser by selecting "New Browser" from the appropriate menu. Referring to FIGS. 10–14, the browser is displayed as a window having three regions including a template list 220 in the upper left portion, a slot list 221 in the upper right portion, and a slot editor area 222 in the lower portion. The template list shows the selected view in a highlighted fashion, and the slot list shows the selected slot, also in highlighted fashion, of the selected view. The various templates and slots in the lists are selected with a pointer. Various slots are edited in slot editor area. Although some slots are edited by simply manipulating text (as in FIGS. 10 and 11), the slots of particular interest in this invention are edited graphically (as in FIGS. 12–14).

Figure 12:
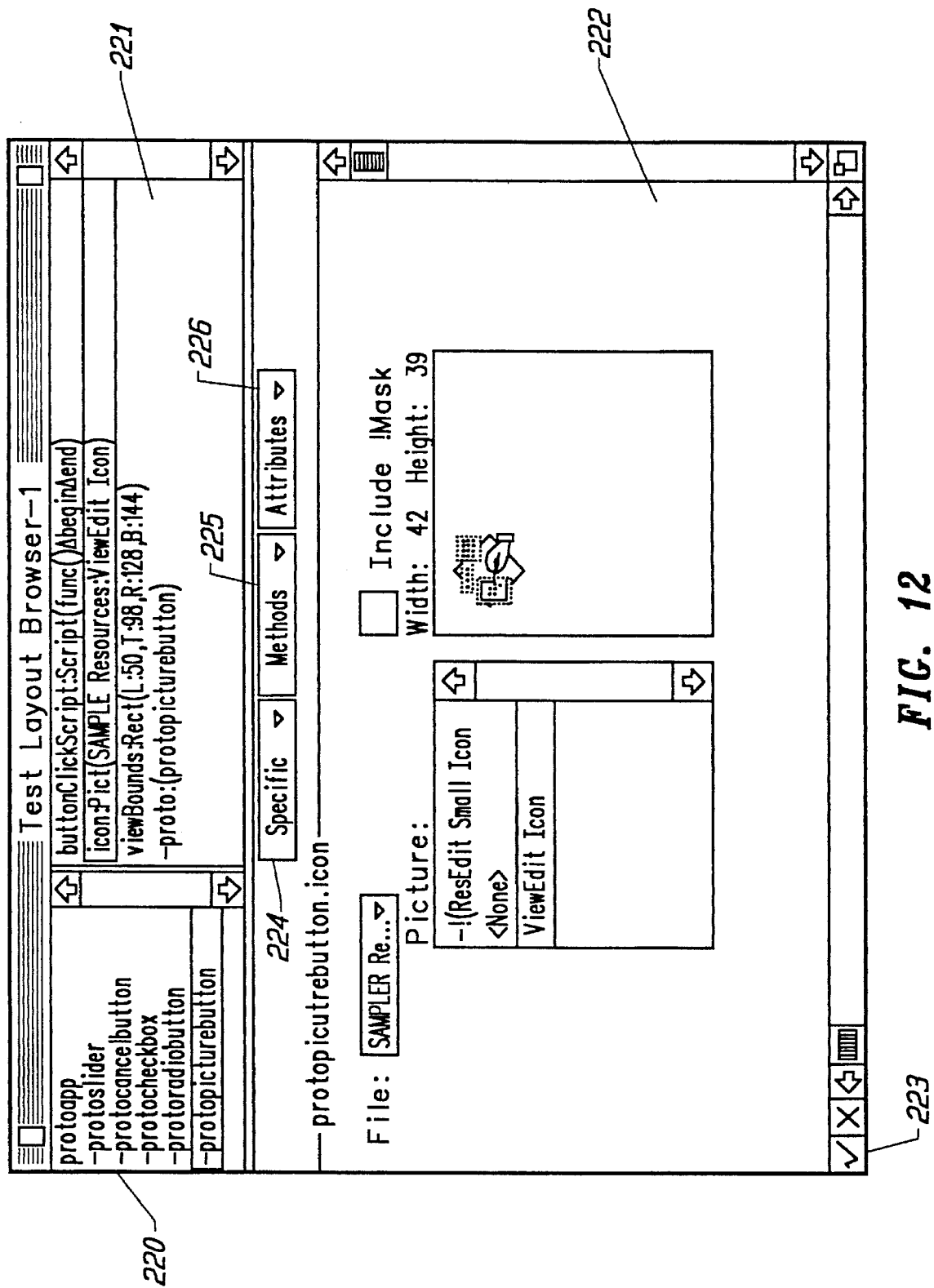
FIG. 12 is an illustration of a browser containing a region for graphically editing a picture view used in an application.
Figure 13:
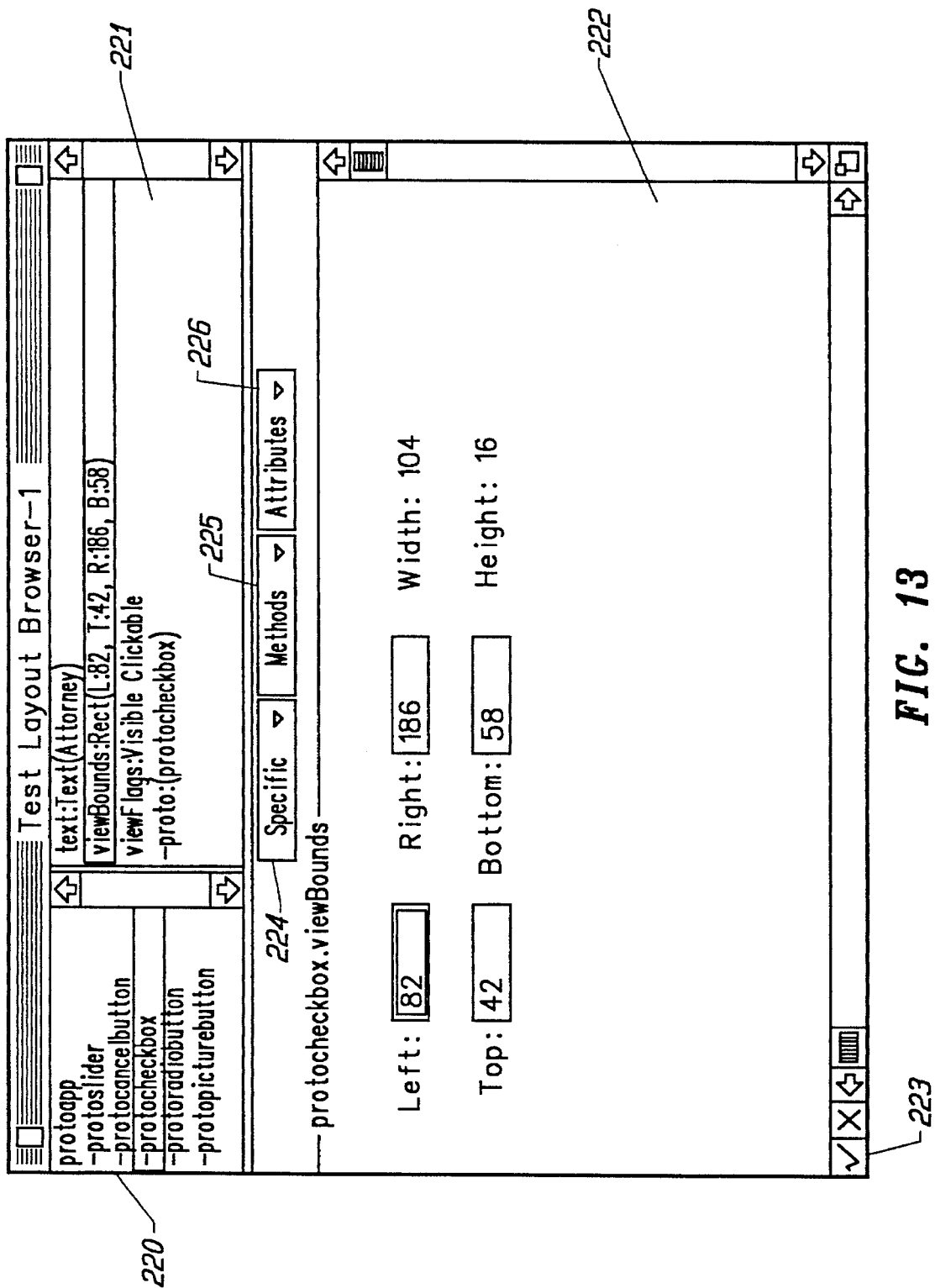
FIG. 13 is an illustration of a browser containing a region for graphically editing a rectangular bounds of a view used in an application.
Figure 14:
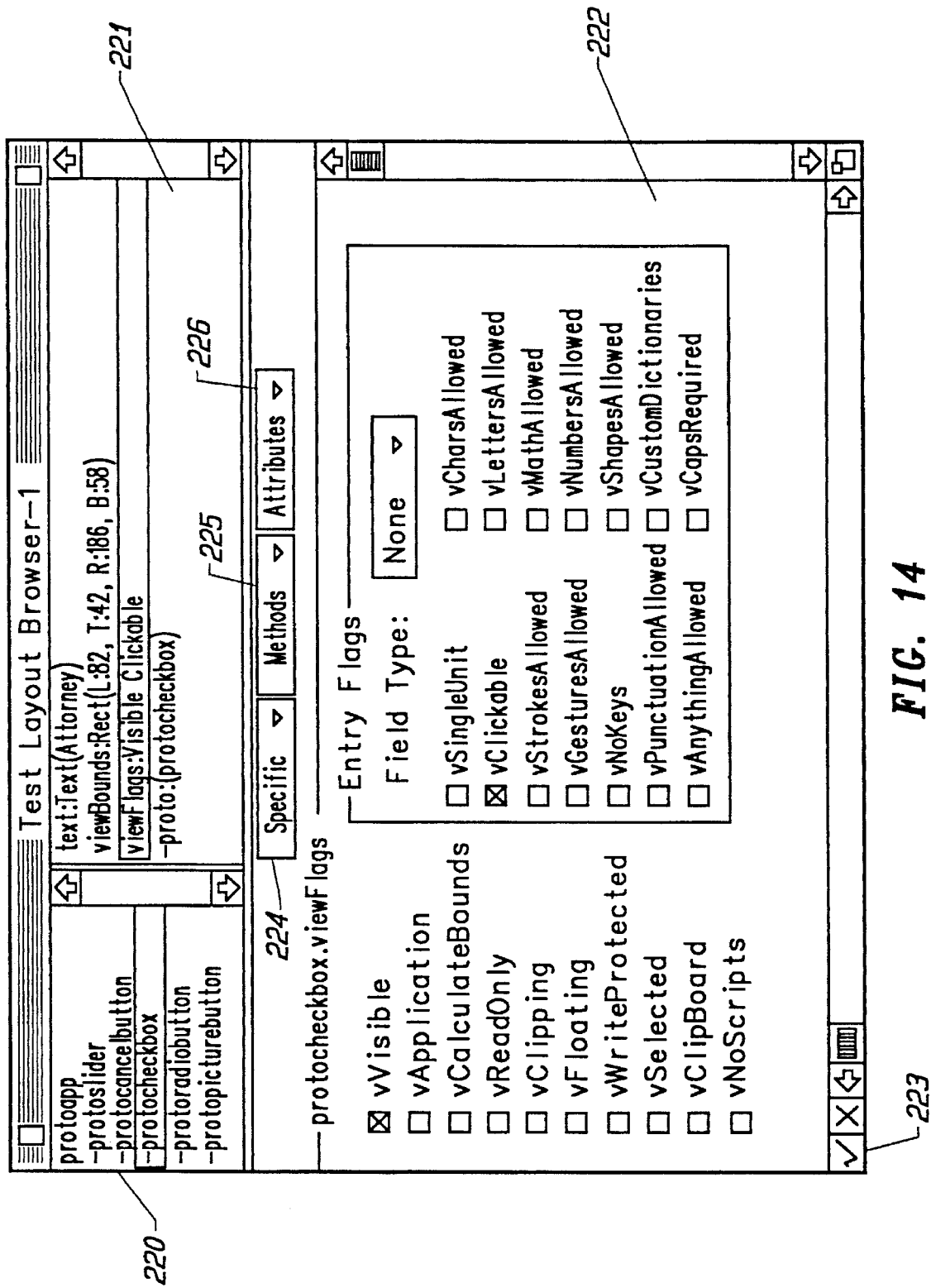
FIG. 14 is an illustration of a browser containing a region for graphically editing a various flags of a view used in an application.

FIGS. 12–14 display various graphical slot editors that may be employed in the present invention. For example, the browser of FIG. 12 allows graphical editing of an picture, the browser of FIG. 13 allows graphical editing of a view boundary, and the browser of FIG. 14 allows graphical editing of various view flags. After editing is concluded, the user selects the "check mark" icon 223 located in the bottom left of the browser to apply the editing changes. Alternatively, the changes can be saved from a menu or by switching to another slot in the browser.

In addition to modifying slots supplied by the system, the user may add a system-defined slot to the view template. This is accomplished by first selecting one of the pop-up menus "Specific" 224, "Methods" 225, or "Attributes" 226 from the browser. These menus list other available slots that can be selected and edited so as to modify the appearance and behavior of the selected view. In addition, the user can define his or her own slot using a "New Slot" command available from an appropriate menu. With this tool, the user can create text slots, script slots, picture slots, rectangle bounds slots, number slots, etc.

The user may layout one or more sub-layout windows separate from the layout window containing the base view. The sub-layout windows are used to break up the application into logical modules and to prevent the base view from becoming too cluttered during application development. The linked view is first created in a new layout window which is opened and saved as described above. In addition, the new layout is added to the project list by selecting "Add Window" from the appropriate menu. Views are added to the new layout window as described above (selecting a graphical interface component from the palette and drawing a rectangle in the layout window). Each view in the new layout window can, of course, be named, edited, and saved as described above.

To make the sub-layout view accessible to the application, the user adds a "LinkedSubview" component to the application's base view. To accomplish this, the user activates the main layout window, selects the LinkedSubview button 212 from the palette, and draws a rectangle for the linked subview in the main layout window. It should be noted that the specific location of the linked subview is not important, as the second computer will display the views of the linked subview at locations defined in the subview layout window. After the linked subview component is added to the main layout window, the linking layout can be connected to the main layout by simply selecting "Link Layout" from the appropriate menu and then selecting the sub-layout window.

Next, the user adds a button that when selected displays the views of the sublayout view. With the main layout window active, the user selects a "protoTextButton" 213 from the palette and then draws a rectangle in the base view to define the size, shape, and position of the button. After, the new button is named, the user edits a "ButtonClickScript" slot for the new button in the slot editor area of the browser. More specifically, the user edits script to instruct the application to open the graphical interface elements of the linked subview when the button is selected.

The user can prepare his or her own "user-defined" proto template by choosing "New Proto Template" from an appropriate menu and then laying out views in the manner described above. Various views and even layers of views can be included in the user's proto template. After the user has added all the views desired, he or she names the new proto and adds it to the project. At this point, the system gives the user access to his or her new proto template through the palette under a "user button" 214. To use the new proto template, the user simply selects it from the user list in the palette and then draws a view rectangle on the layout window as he or she would for any system-defined view.

At any time during the development of the application, the user can see what a view will look like on the second computer's display screen by choosing a "Preview" command from an appropriate menu. FIG. 8 shows a layout window in preview mode, while FIG. 9 shows a layout window in normal mode. When the user is ready to test the application, he or she builds and downloads a package containing the application. As far as the user is concerned, this process simply involves selecting the commands "Build Package" and "Download Package" from appropriate menus. Thereafter, the user can inspect and debug the application through an interactive debugger that lets the user browse the second computer's object storage system and execute script on the second computer.

III. PREPARATION OF A PACKAGE

The process details associated with preparing packages according to this invention will now be discussed. Packages are routed throughout the second computer system via an entity known as a "package manager". Packages and package managers are discussed in more detail in U.S. patent application Ser. No. 08/099,841 filed Jul. 30,1993 on behalf of Culbert and Welland, entitled STRUCTURE AND PROTOCOL FOR ROUTING INFORMATION IN A SYSTEM, and assigned to the Assignee of the present application. That application is incorporated herein by reference in its entirety for all purposes.

Briefly, packages includes a series of "parts," each of which contains information such as applications, dictionary entries, books, fonts, printer drivers, modem drivers, etc. In addition, each package contains a package directory (located in front of the parts) that identifies the package and provides information about the package and its parts that can be used by the computer system. In preferred embodiments, the package directory is divided into three components: (1) a package header, (2) a part directory, and (3) an information area. The package header includes an identifier at the very beginning of the package indicating that the succeeding material is in fact a package. In addition, the package header includes one or more pointers (or "information references") that point to the location of the package name, the package size, the directory size, and other information. The part directory includes "part entries" for the individual parts contained in the package. Each part entry contains an information reference specifying the location of a particular part and, in addition, some other information about the part.

Finally, the third region of the package directory, the information area, contains the specific information pointed to by information references in the package header. This includes the package name, the package size, the directory size, and other items pointed to by information references in the preceding portions of the package.

FIG. 3 presents an overview of the process employed to create a package according to a preferred embodiment of the present invention. The process begins at 80 and proceeds to a step 84 where a project is opened. The details of this step will be provided below. After the project has been opened, a process step 86 processes any user commands directed at particular files contained within the opened project. Next, after the user has completed his or her operations on the files, a package from the files in the project in a step 88. After this, the new package is downloaded in a step 90. It should be noted that in preferred embodiments, the steps of building an application or other body of information are performed on a first computer, and the resulting body of information is run a second computer. Preferably, the second computer is a stylus-based computer and the first computer is a desktop computer. In alternative embodiments, the first and second computers are the same machine. After the package has been downloaded in step 90, a decision step 94 determines whether the downloaded package performs as desired. Typically this will involve evaluating the application or other material in the package on the second computer. If the user determines that the information performs as desired (i.e., decision step 94 is answered in the affirmative), the process is completed at 96. If, however, the downloaded package does not perform as desired, the process should return to step 86 where any further user commands are processed. Thereafter, steps 88, 90, and 94 are performed as before.

Figure 4:
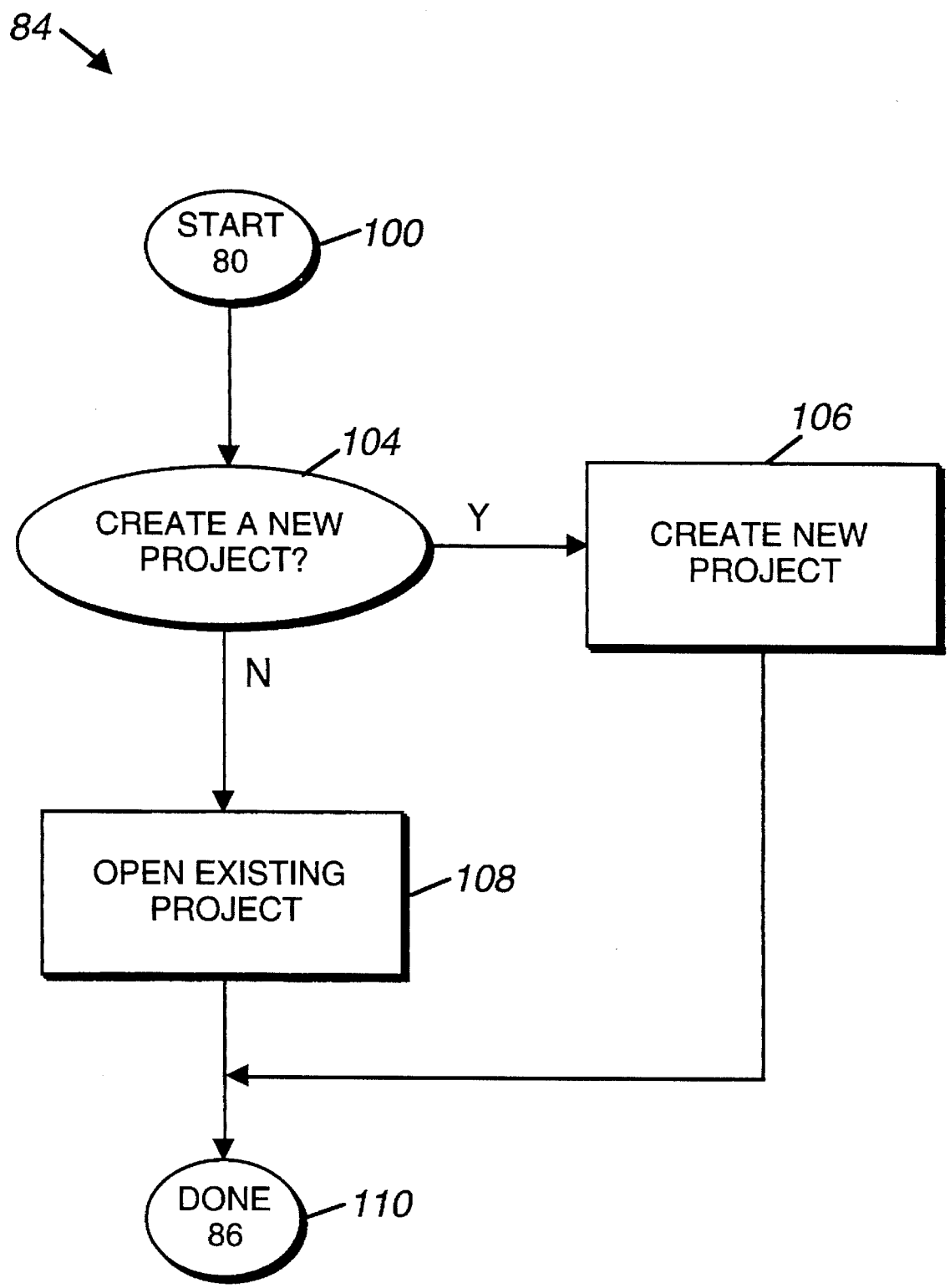
FIG. 4 is a process flow diagram detailing the steps employed in opening a project used to hold the files that ultimately form the package.

FIG. 4 details the steps employed when a user opens a project (i.e., step 84 of FIG. 3). The process begins at 100 (following step 80 of FIG. 3) and proceeds to a decision step 104 which determines whether the user wishes to create a new project. As noted above, a "project" defines an application or other body of information prepared with the aid of the present invention. When a user enters the development environment of this invention (sometimes referred to as a "tool kit"), he or she may either work on an existing project or open a new project. Thus, if decision step 104 is answered in the affirmative, a new project is created in a step 106. Thereafter, the process is completed at 110 (immediately before step 86 from FIG. 3 is performed). If decision step 104 is answered in the negative, a step 108 opens an existing project selected by the user and the process is completed at 110. FIG. 5 shows a screen shot of a project window for an existing project which would be displayed at step 108 of FIG. 4.

Figure 6:
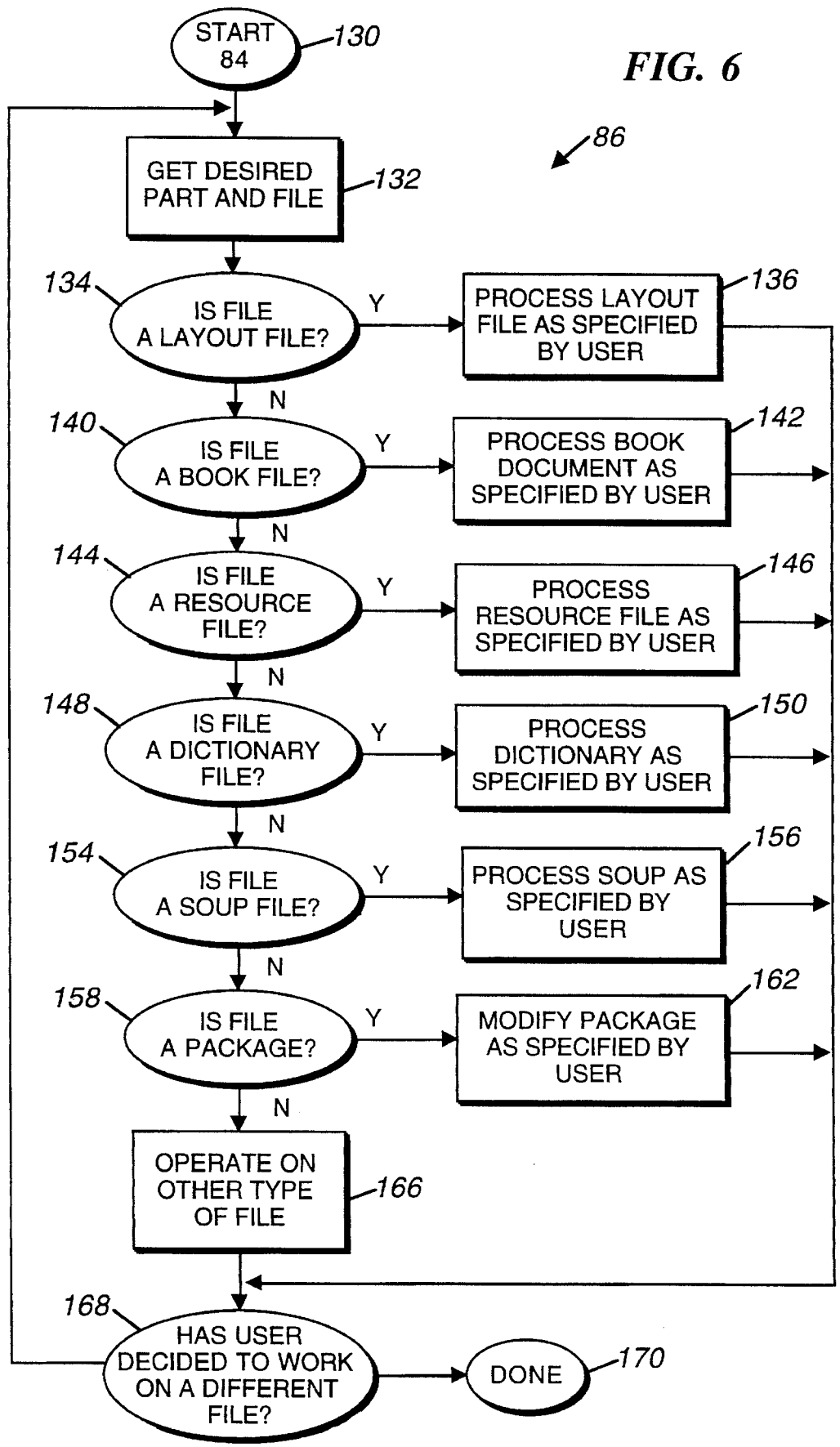
FIG. 6 is a process flow diagram showing the general processing steps employed by the first computer system in handling user inputs pertaining to project files.

FIG. 6 details the process employed in processing user commands which modify the files contained in a project (displayed in the project window shown in FIG. 5). Thus, FIG. 6 details the process identified in step 86 of FIG. 3. The process begins at 130 and in a step 132 opens the "parts" (files) selected by the user. As noted, parts are units of data contained in a package. In preferred embodiments, the user will select the file by double clicking on that file's entry in the project window. After the desired file has been opened, the system must identify the type of file and process any user commands associated with that file. The file types considered in FIG. 6 include layout files, book files, resources files, dictionary files, soup files, and package files. To better illustrate the complete range of functions provided by the system of this invention, FIG. 6 is shown as a series of decisions steps, each with an associated process step. It should be understood, however, that in preferred implementations the system automatically recognizes the type of file it has been opened, rather than checking for each different type of file.

As presented in FIG. 6, a decision step 134 determines whether the current file is a layout file. If so, a step 136 processes that layout file according to instructions specified by the user. Thereafter, the process moves to a decision step 168 which determines whether the user has decided to work on a different file. If not, the process is completed at 170. If, on the other hand, the user, has decided to work on a different file, process control returns to step 132 where the desired part and file are opened.

If decision step 134 determines that the current file is not a layout file, a decision step 140 determines whether it is a book file. If so, a step 142 processes the book document associated with file as specified by the user. This may simply involve editing a book document to insert or modify dot commands at desired locations. Book documents can be interpreted and converted to electronic books as discussed in U.S. patent application Ser. No. 08/147,055, filed on Nov. 3, 1993, naming the Shwarts et al. as inventors, entitled METHOD FOR PREPARING ELECTRONIC BOOKS, and incorporated herein by reference for all purposes. After step 142 has processed the book document, the process moves decision step 168 and proceeds as described above. If decision step 140 determines that the current file is not a book file, a decision step 144 determines whether is a resource file. In general resource files are catch all files that allow a developer to incorporate arbitrary pieces of content in the final application. Examples of such content include text, fonts, pictures, sounds, etc. If decision step 144 determines that the file is a resource file, a step 146 processes any users edits of that file. Thereafter, the process moves to decision step 168 and follows the procedure described above. If decision step 144 determines that the current file is not a resource file, a decision step 148 determines whether it is a dictionary file. If so, the dictionary file is processed as specified by the user in a step 150. Process control then moves to step 168 and proceeds as described above. Step 150 will be discussed in more detail below. If decision step 148 determines the file is not a dictionary file, a decision step 154 determines whether it is a "soup" file. Soups refer to collections of data objects which can be accessed by various applications in a computer system. One example might be a soup of cities that are identifiable by city names. Associated with each city object would be various attributes such as its population, the country it is located in, its elevation, etc. If decisions step 154 determines that the current file is indeed a soup file, a step 156 processes the soup as specified by the user. Process control then moves to decision step 168 as described above. If decision step 154 determines that the current file is not a soup file, a decision step 158 determines whether it is a package. As noted, packages are collections of data that can be recognized and used by the second computer system. If the file is indeed a package, a step 162 modifies the package according to any instructions specified by the user. The process then moves to decision step 168 as described above. Finally, if decision step 158 determines that the file is not a package, a process step 166 operates on any other type of file that may be applicable to the current project. Although not described in detail herein, such other types of file might include "C" or "C++" or assembly code for, e.g., a driver or protocol. Protocols are named pieces of code that provide certain functions to an entire computer system.

It should be noted that some process steps of FIG. 6 (particularly those involving selecting book files and resource files) may involve opening the application in which the files were created. For example, a book document have been prepared in a word processing application such as Microsoft Word (from Microsoft Corporation, WA). When a user selects the book file associated for that document, Microsoft Word will first be launched and then the book document itself will be opened. Thereafter, the user can modify the document in accordance with process step 142.

Figure 7:
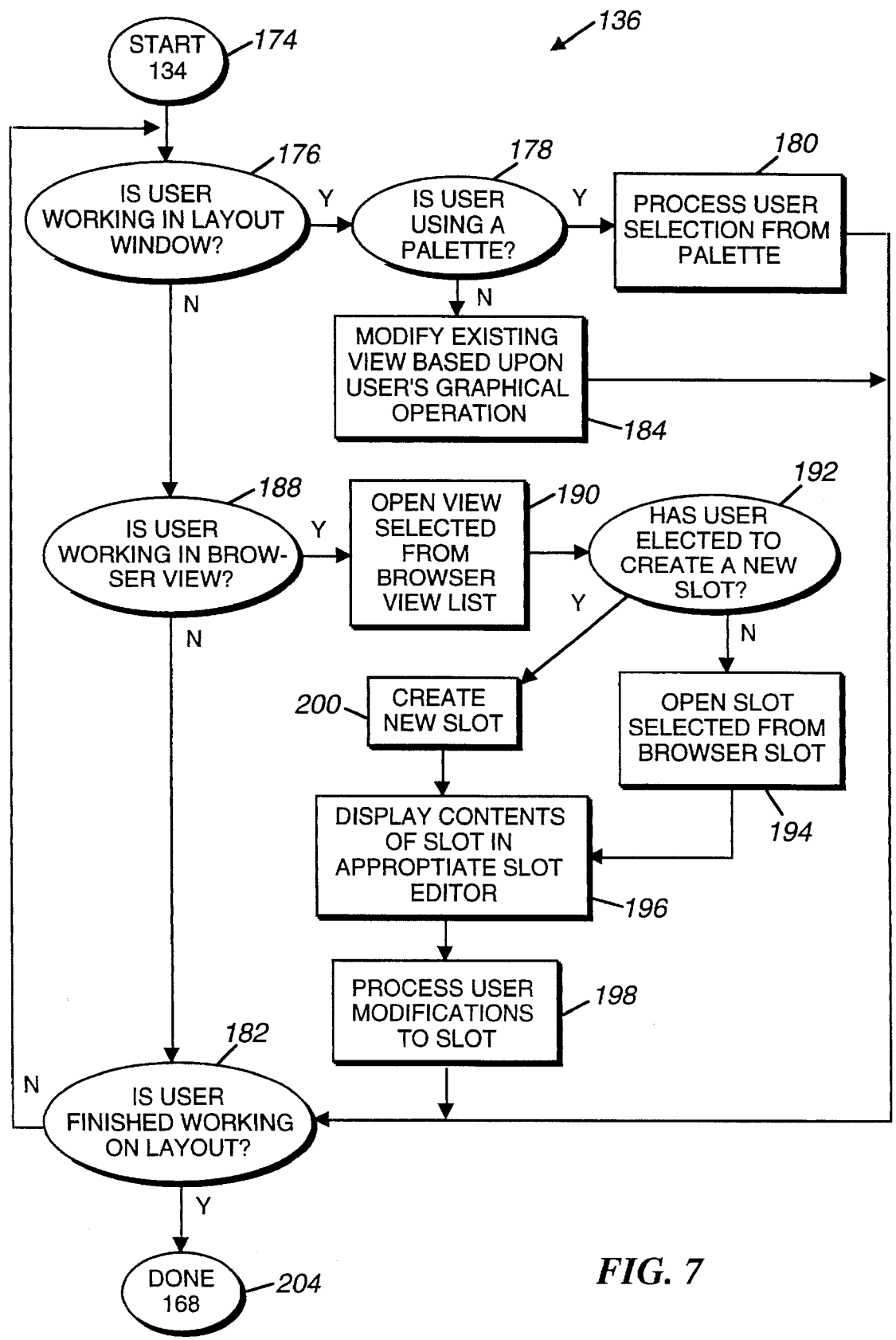
FIG. 7 is a process flow diagram showing how a layout file is processed according to user instructions during development of an application.

The process employed in step 136 (preparing a layout window—application) will be described in more detail below in connection with FIG. 7. The process begins at 174 and in a decision step 176 determines whether the user is working in a layout window (such as window 206 in FIG. 8). If the user is not working in the layout window, a decision step 188 determines whether the user is working in a browser view (such as one of those displayed in FIGS. 10–14). If the user is working in neither a layout nor a browser window, a decision step 182 determines whether the user is finished working on the current layout. If so, the process is completed at 204. This may be evidenced by closing the layout window. If decision step 182 determines that the user is not, in fact, finished working on the current layout, process control is returned to decision step 176.

If it is determined at step 176 that the user is working in a layout window, a decision step 178 determines whether the user is using a palette. If so, a process step 180 handles any user selections from the palette. If decision step 178 determines that the user is not using a palette, a step 184 modifies an existing view in the layout window based upon steps taken by the user. This will typically involve drawing a rectangle defining the location and size of a view on layout window. However, it may also involve modifying the boundaries of a view previously drawn on the layout window. Other operations that can be performed on a view in the layout window include moving and resizing views (alone or in groups), duplicating or deleting a view, etc. The "drawing order" of views can also be changed (so that over lapping views draw in different order) using "Move Forward" and "Move Backward" commands. Alignment can also be done by selecting desired views and using an alignment tool such as the alignment buttons on a palette.

As shown in FIG. 8, palette 207 contains two pop-up menus and various buttons. The "selection" pop-up menu 215 contains a list of all component buttons shown on the palette 207. Thus, the user can select a component from either pop-up menu 215 or one of the view buttons on the palette. The top layer of buttons 216 provide various alignment functions with which the user can arrange a plurality of selected views in a desired orientation. The buttons below alignment buttons 216 are view buttons which define various graphical interface elements such as radio buttons, slide bars, text input lines, etc. One of these, a linking button 212, provides a view through which one layout window is connected to another layout window. As described, this allows an application to be divided into logical modules and prevent clutter of a main layout view. The "user button" 214 allows selection of user-defined proto templates. These are composite views defined by the user. They are often used as short hand ways of incorporating collections of views that are used repeatedly in an application.

A user incorporates a view in the layout window by (1) selecting a desired view from the palette, and (2) drawing a rectangle on the layout window at the location where the view is to be the displayed. Rectangles for a base view 216 and a ProtoLabelInputLine 217 as shown in FIG. 9. The layout may also be shown in a "preview" mode as illustrated in FIG. 8. In preview mode, the graphical interface elements defined by the views are displayed as they might as appear when the application is running on the second computer system. As shown in FIG. 8, the graphical interface elements may include a slide bar 218, a radio button 219, etc. In preferred embodiments, the palette also has components for non-graphical element such as communications and data storage capabilities.

Returning now to FIG. 7, if decision step 188 determines that the user is working in a browser view, a process step 190 opens the view selected from the browser view list. The browser view list contains all currently selected views in the layout window and all their descendants. In addition, the browser includes all changes made in the original set of views (e.g. add child views, remove child views, etc.). If no views are selected when the browser is created, the browser targets the topmost view in the layout. The view list is displayed in region 220 as shown in FIGS. 10–14. The selected view (shown in highlighting within the view list 220) will have its available slots displayed in slot list 221 shown in FIGS. 10–14.

After the selected view has been opened in the browser, a decision step 192 determines whether the user has elected to create a new slot for the selected view. If so, a new slot is created in a step 200. The user creates a new slot by selecting a system-defined slot from one of the pop-up menus 224, 225, or 226 shown in the browsers of FIGS. 10–14. Alternatively, the user can create a new slot by selecting a "New Slot" command from an appropriate menu. After a new slot has been created, the contents of that slot are displayed in an appropriate slot editor in step 196. Thereafter, any user modifications to the slot are processed in a step 198. From there, decision step 182 determines whether the user is finished working on the layout. If decision step 192 determines that the user has not elected to create a new slot, then a step 194 opens the slot selected from the slot list 221. From there, the slot contents are displayed and modified in steps 196 and 198.

In preferred embodiments, the browser provides various additional functions such as (1) sorting views by type or hierarchy, (2) sorting slots by type or name, (3) changing a view's drawing order, and (4) changing a view's parent.

As shown in FIGS. 10–14, the contents of a slot can be displayed in various slot editors, depending the type of slot. For instance, script or text can be edited according to standard text editing protocols in the slot editing regions 222 shown in FIGS. 10 and 11. In FIG. 12, the slot editor allows graphical editing of a picture icon. In FIG. 13, the slot editor provides a graphical display of the boundaries of a particular view. By typing in the exact locations of the view bounds, the user can carefully control the final location of a graphical interface element. The slot editor shown in FIG. 14 provides numerous check boxes allowing the user to turn off or on various flags associated with particular view. As will be apparent to those of skill in the art, various other graphical formats maybe used for editing views.

As noted, the system-defined slots are divided into three lists, "specific" 224, "methods" 225, and "attributes" 226. The specific list contains optional slots specific to a proto template in which the current view template is based. Slots in the specific list may contain either attributes or methods. The method list contains method slots common to a subset of the proto templates. The attributes list contains attributes slots common to a subset of the proto templates.

Figure 15:
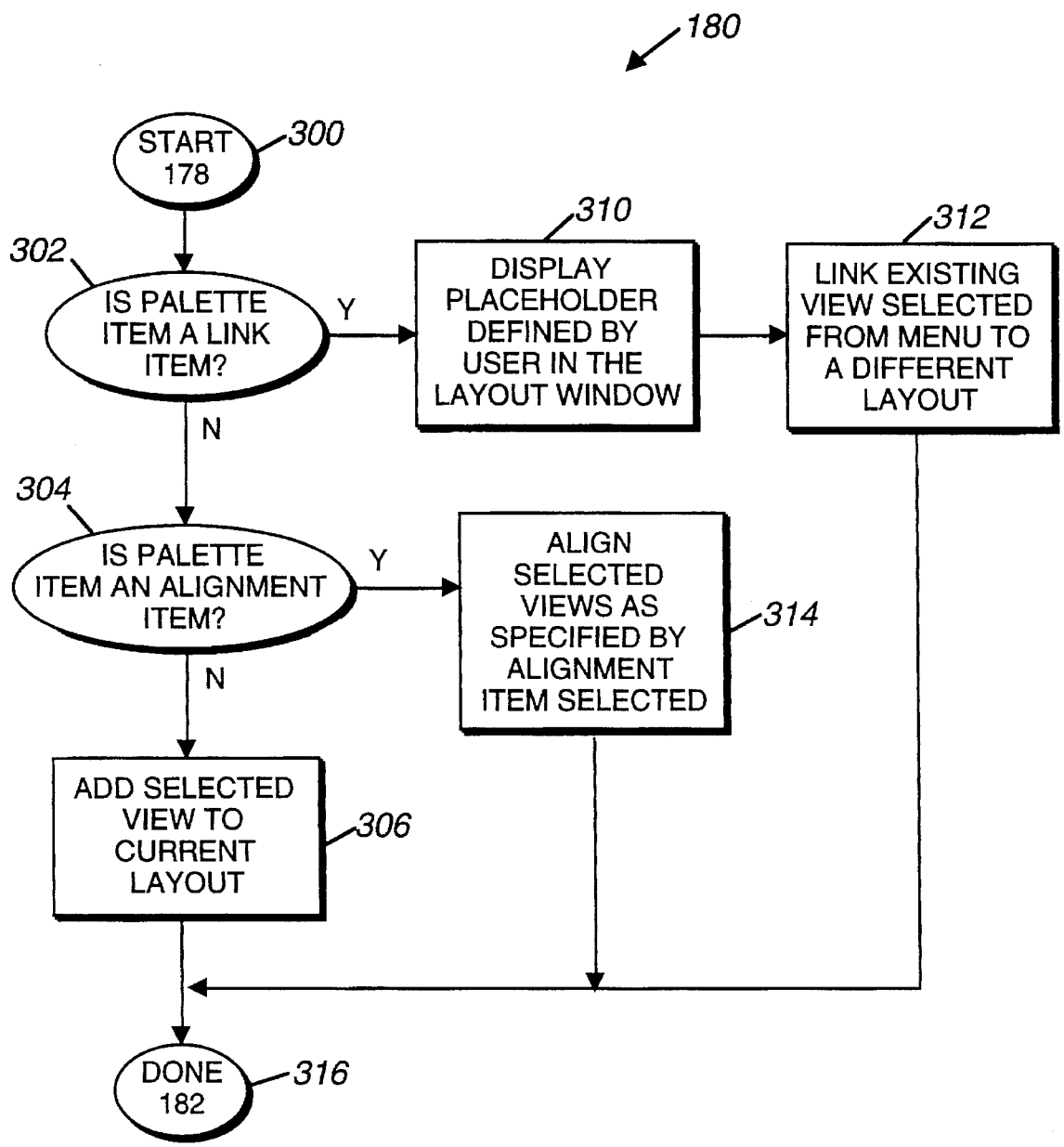
FIG. 15 is a process flow diagram detailing the operation of a palette window in response to various selections from a user.

Referring now to FIG. 15, the processing of a users selection from the palette (step 180 of FIG. 7) is detailed. The process begins at 300 and in a decision step 302 determines whether the palette item is a (link) item. The palette button 212 defines a linking view. As noted, such views connect two different layouts windows and the views they contain. If decision step 302 is answered in the affirmative, a process step 310 displays a place holder (that is, the bounding rectangle drawn by the user) defined in the layout window. Next, a step 312 links an existing view in the currently open layout window to a different layout window using a "Link Layout" menu command. Thereafter, the process is completed at 316.

If decision step 302 is answered in negative, a decision step 304 determines whether the palette item is an alignment item. As noted, the top row of buttons on the palette are alignment items. If decision step 304 is answered in the affirmative, a step 314 aligns selected views as specified by the alignment item. Thereafter, the process is completed at 316.

If both decision steps 302 and 304 are answered in the negative, a step 306 adds the selected palette view item to the current layout. As noted, this accomplished by first pointing to a view item on the palette, and then drawing a bounding rectangle on the layout window. After the selected palette view has been added to the layout window, the process is completed at 316.

Figure 16:
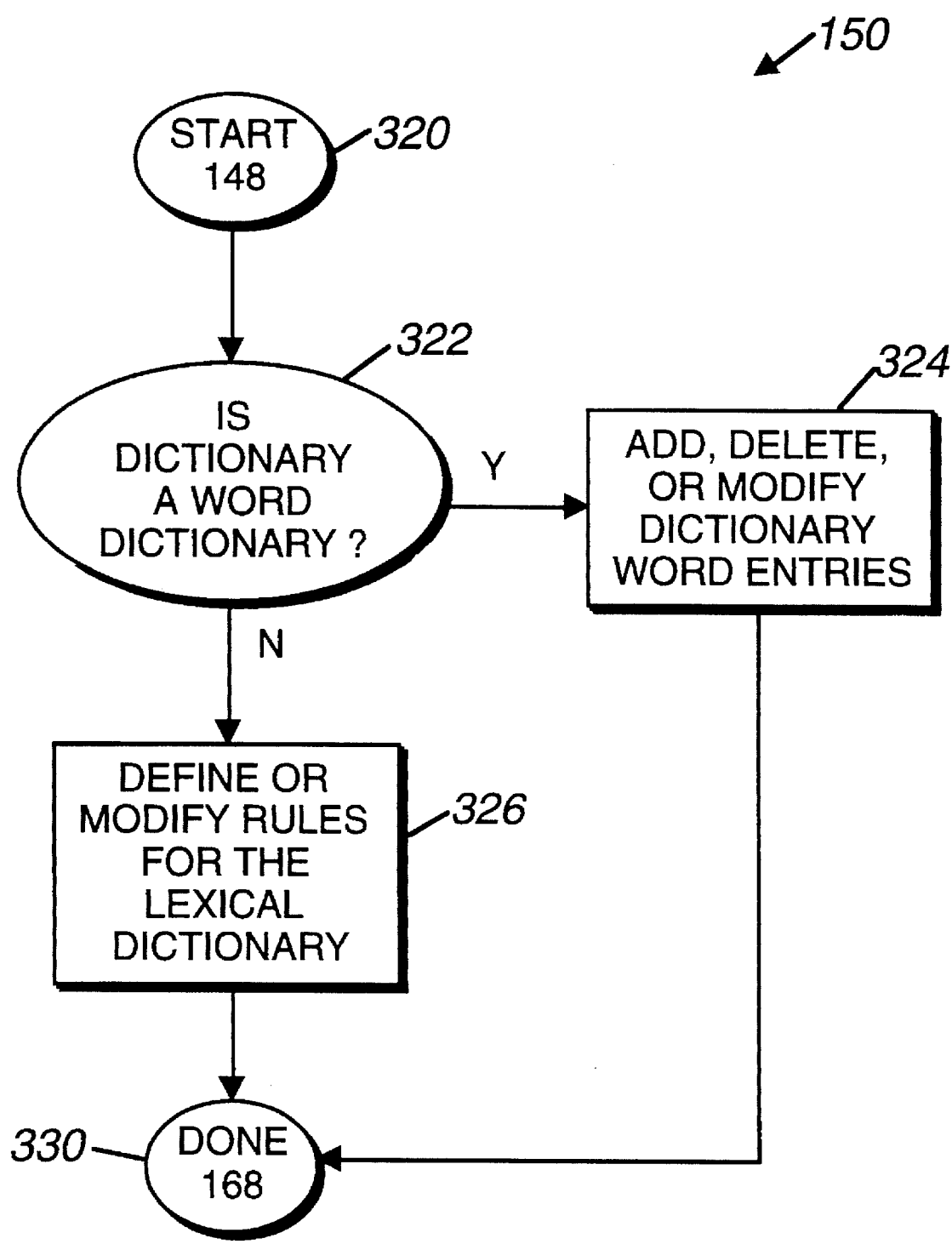
FIG. 16 is a process flow diagram showing how a dictionary file is added to a project.

The process of editing a dictionary as specified by the user (step 150 of FIG. 6) is detailed in FIG. 16. In preferred systems of this invention, both conventional word dictionaries as well as "lexical" dictionaries can be handled. Lexical dictionaries specify defined rules for words. The process begins at 320 and in a decision step 322 determines whether the dictionary is a "word" dictionary. If so, a step 324 simply adds, deletes, or modifies dictionary word entries. If, however, decision step 322 is answered in the negative, a step 326 defines or modifies a rule for a lexical dictionary. After either of steps 324 or 326, the process is concluded at 330.

Some of the remaining process steps presented in FIG. 6 (e.g., processing a resource file) can be handled by conventional computer applications. For instance, if the resource file is a picture, it can be processed by using an appropriate picture editing tool. On the other hand, the elements of a soup can be modified by an appropriate editing tool, be it a text, picture, graph, etc. tool, available in the development environment of this invention.

Figure 17:
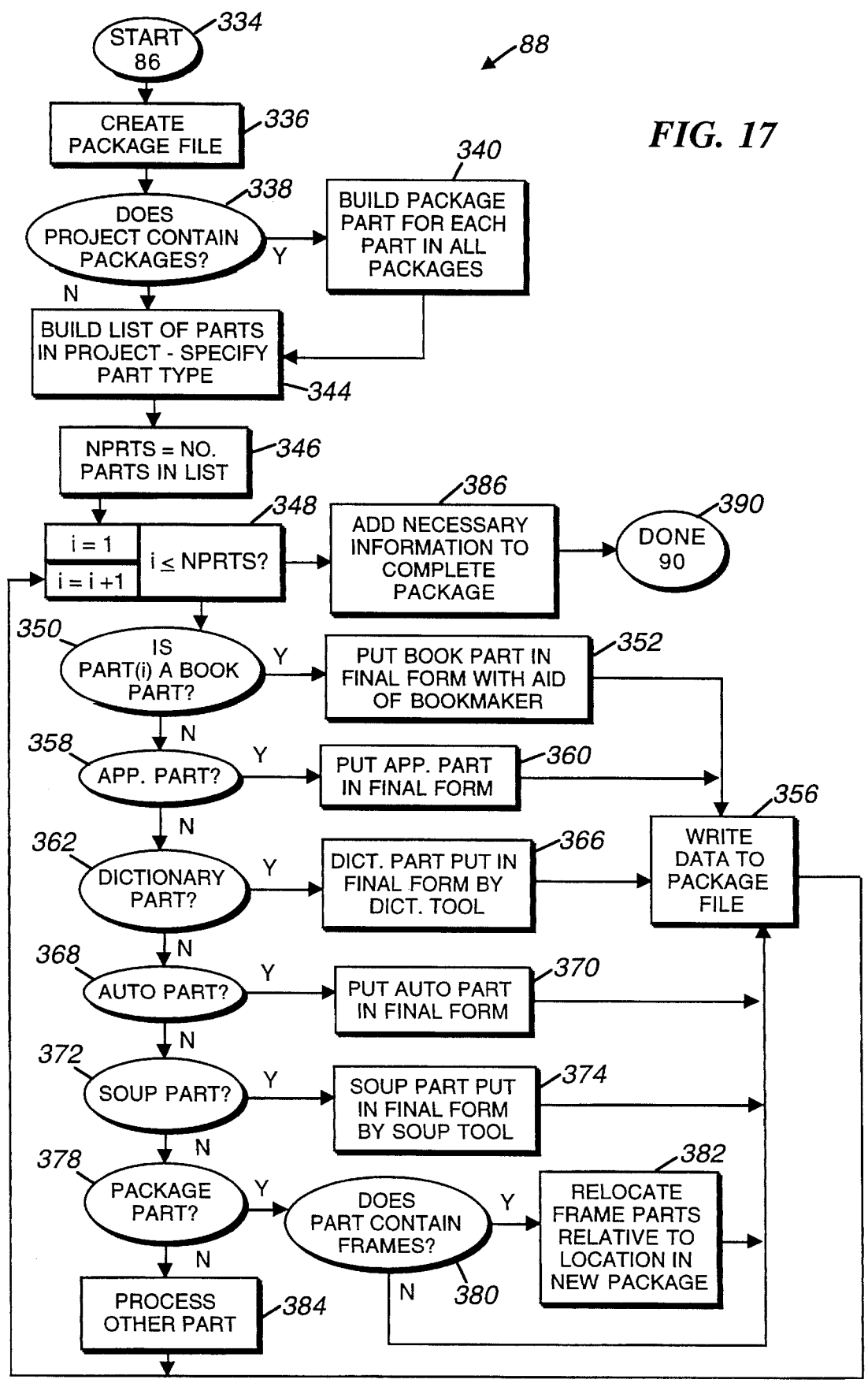
FIG. 17 is a process flow diagram detailing the steps employed to create a package from potentially many different files.

FIG. 17 details the process associated with building a package from available files in a project (step 88 of FIG. 3). The process begins at 334 and in a step 336, a package file is created to hold the subsequently prepared package. Next, a decision step 338 determines whether the project under consideration contains any packages. If so, a step 340 builds a new package part for each part in the preexisting package or packages. At this point, a list of all parts in the project (including those coming from any preexisting package) is built in a step 344. The "part type" of each part in the list is also specified. Part type specifies whether the part is an application part, a soup, a book part, etc. If should be noted if decision step 338 is answered in the negative, the process proceeds directly to step 344 where the parts list is built.

After step 344, the total number of parts in the list is specified in a in a step 346. Then, an iterative loop step 348 initializes a part counter "i" to 1 and determines whether the current value of i is less than or equal to the value of NPRTS (the total number of parts in the list). If step 348 determines that i is indeed less than or equal to NPRTS, a decision step 350 determines whether the current part, part (i), is a book part. If so, a process step 352 puts that book part in final form with the aid of a bookmaker tool. As mentioned, such tools are described in U.S. patent application Ser. No. 08/147,055, previously incorporated by reference. Thereafter, a step 356 writes the data from the book part into the package file previously created in step 336. Processes control then returns to iterative loop step 348 where the counter "i" is incremented by 1. If the value of i still remains less than or equal to NRPTS, decision step 350 evaluates the current part to determine whether it is a book part. Assuming that it is not a book part, a decision step 358 determines whether is it an application part. If the current part is indeed an application part (containing layout views, etc. as described above), a step 360 puts that application part in final form for writing to the package file at step 356. As before, process control then returns to iterative loop step 348. If decision step 358 is answered in the negative, a decision step 362 determines whether the current part is a dictionary part. If so, a dictionary tool puts the part in the appropriate form for packaging in a step 366. The dictionary part is then written to the package file in step 356 in the process proceeds as described above. If decision step 362 determines that the current part is not a dictionary part, a step 368 determines whether it is an "auto" part. An auto part contains code that behaves like a conventional application, but which does not have an associated icon. If step 368 determines that the current part is indeed an auto part, a step 370 puts that part in final form for packaging in the package file. Thereafter, the step 356 writes the part to the package file and the process proceeds as described above. If decision step 368 is answered in the negative, a step 372 determines whether the current part is soup part. If so, a soup tool puts that part in a form for packaging in a step 374. Thereafter, step 356 writes that part to the package file and the process proceeds a described above. If decision step 372 determines that the current part is not a soup part, a step 378 determines whether it is a package part. As noted above, the project used to create the current package may itself include other packages. Step 378 determines whether the part is, in fact, one of these pre-existing packages. If it is, a decision step 380 determines whether the parts of that pre-existing package contains frames. If so, these parts must be relocated relative to their location in a newly created package. That process is carried out in step 382. Thereafter, the step 356 writes the relevant part information to the new package file and the process proceeds as described above. If decision step 380 determines that the package part does not contain frames, the process control directs the process to step 356 where the part data is written to the new package file. If decision step 378 determines that the current part is not a package part, then the part must be of a type that was not identified above. In that case, a process step 384 processes and writes this other type of part to the new package file. Thereafter process control is returned to iterative loop step 348.

After all the parts in the part list have been processed, the value of the counter "i:" will no longer be less or than or equal to NPRTS. When this occurs, iterative loop step 348 directs control to a step 386 which adds the necessary information to complete the package. Such information includes headers identifying the part types and their locations so that the second computer system can effectively make use of the parts. This process is described in U.S. patent application Ser. No. 08/099,841 entitled STRUCTURE AND PROTOCOL FOR ROUTING INFORMATION IN A SYSTEM, previously incorporated by reference. The process is completed at 390.

In step 352 of FIG. 17, a book part is put in a final packaging form with the aid of a book making tool. Initially, this involves using the system of this invention to process any layout files associated with the book. Such files are analogous to the layout files formed during preparation of applications as described above. The book layouts are then sized and arranged to an appropriate page format as described in U.S. patent application Ser. No. 08/147,055 mentioned above. Then, also as described in the above application, the book is converted to an appropriate script form that can be read by the second computer system. Thereafter, the system of this invention compiles and executes these scripts to produce a book frame which is used in the final package.

Figure 18:
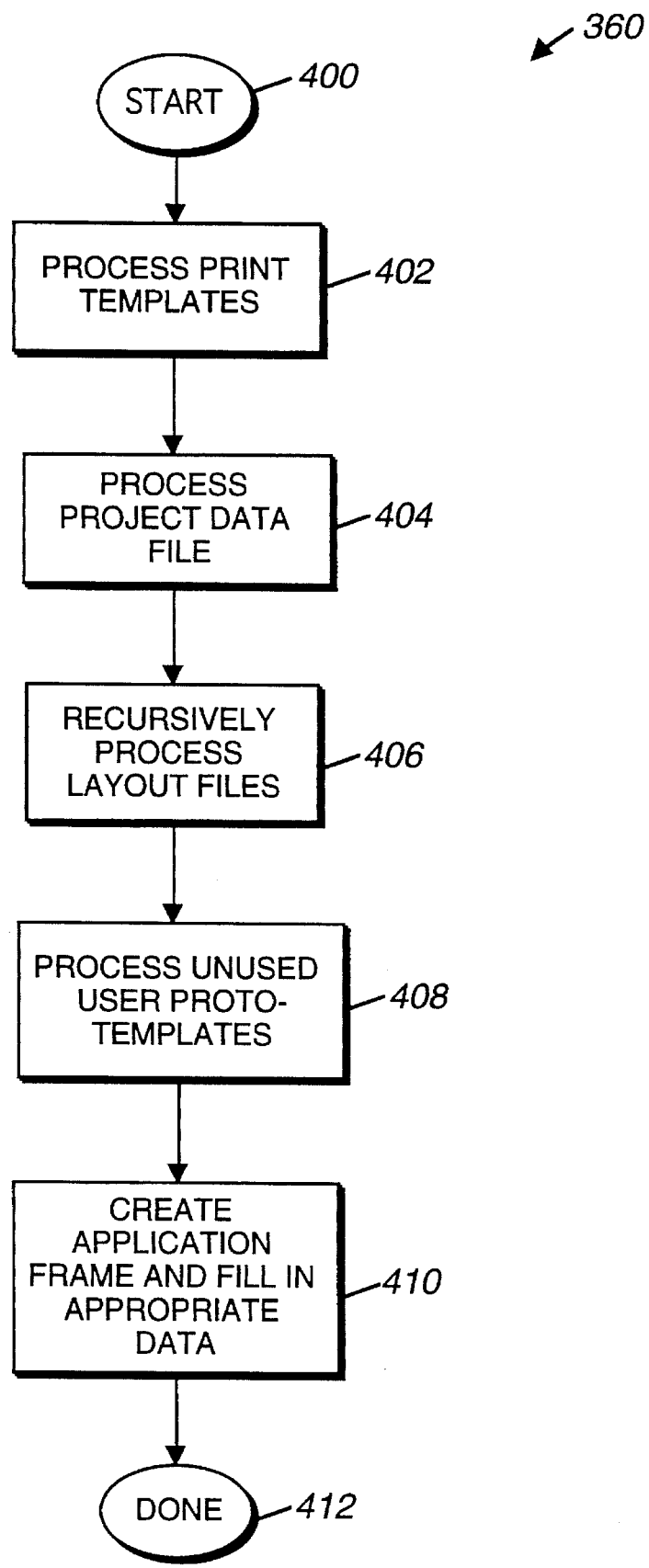
FIG. 18 is a process flow diagram detailing the step by which an application file(s) is/are added to a package created as in FIG. 17.

FIG. 18 details the process associated with putting in application part in final form (step 360 of FIG. 17). The process begins at 400 and in step 402 processes any print templates associated with the application. Such templates simply provide some formatting options available when the application is running. Next, a process step 404 processes any project data file associated with the application. A project data file is adjunct to the project, allows the user to make declarations available to the project at the time of compiling. It is also a vehicle for defining install and remove scripts for the application. An install script is run when the package is installed on the second computer system. A removed script is run when the package is removed from the second computer system. After step 404 has been formed, a step 406 recursively processes the various layouts files contained in the application. Then, a step 408 processes any unused user proto-templates. These are associated with user-defined views created but not used in the application development. Next, a step 410 creates an application frame and organizes the appropriate data from the application in that frame. The process is then completed at 412.

Figure 19:
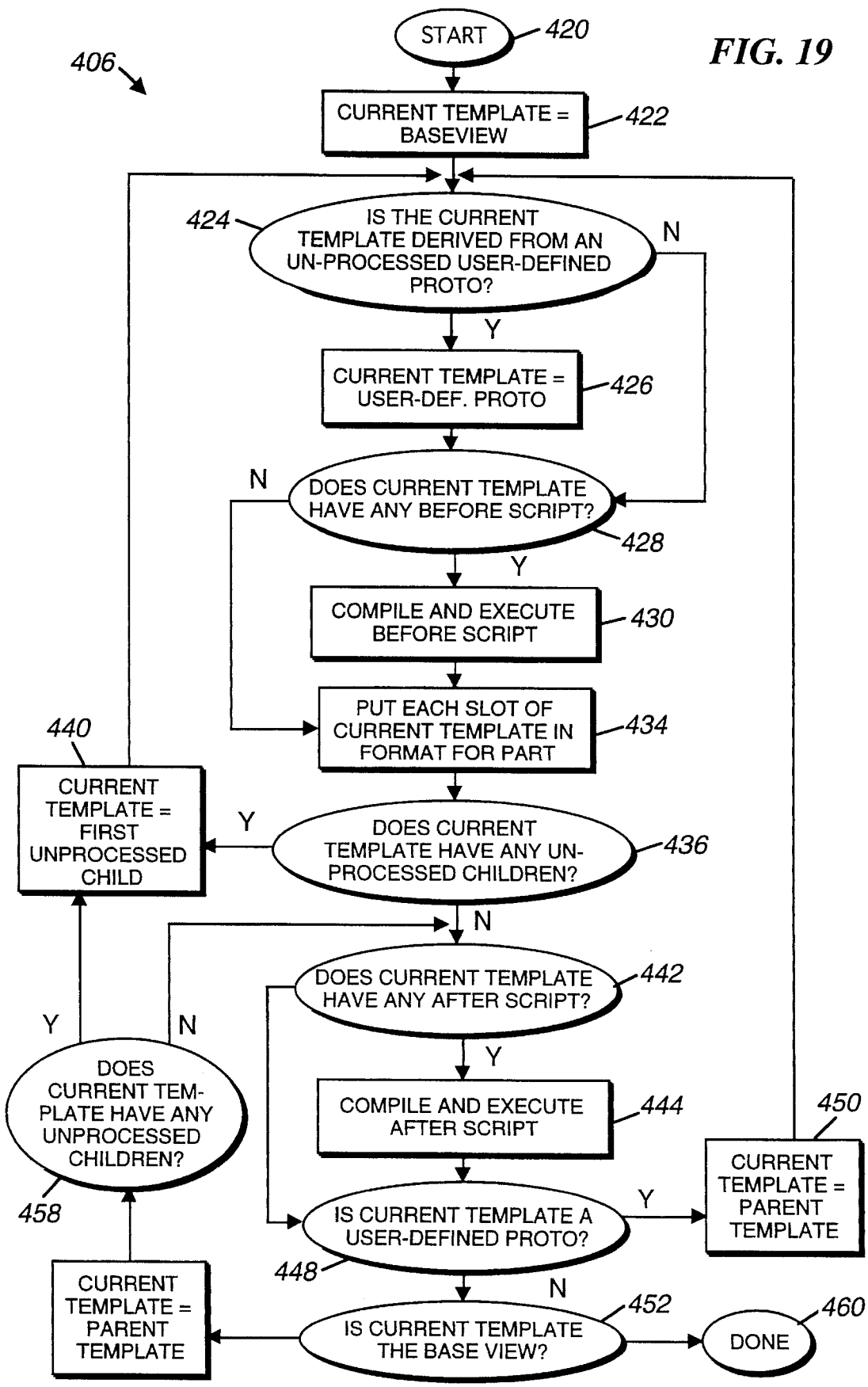
FIG. 19 is a process flow diagram detailing the step by which an application are added to a package.

The process of recursively processing the layout files of a application (step 406 of FIG. 18) is detailed in FIG. 19. The process begins at 420 and proceeds to a step 422 where a variable referred to herein as the "current template" is set equal to the base view template. The "current template" is used in FIG. 19 to reference the template that is currently being processed during the packaging process.

After step 422, a decision step 424 determines whether the current template is derived from an unprocessed user-defined proto-template. If it is determined that the current template is in fact derived from an unprocessed user-defined proto-template, a step 426 sets the current template equal to the unprocessed user-defined proto-template. This step insures that user-defined proto-templates are processed first. Next, a decision step 428 determines whether the current template has any "before scripts." If so, the before script is complied and executed in a step 430. The process then proceeds to a step 434 where each slot of current template (that is not a before or after script) is put into a form used in the application part. Before and after scripts provide codes specific to a particular view. These scripts are executed immediately before or after the other slots of a template are processed at compile time. Further, the before and after scripts exists in slot at compile time but not at run time. It should be noted that if decision step 428 determines that the current template has no before scripts, the process moves directly to step 434. It should also be noted that if decision step 424 determines that the current template is not derived from an unprocessed user-defined proto-template, the process proceed directly to decision step 428.

After each slot of the current template has been put in the appropriate format, a decision step 436 determines whether the current template has any children (that is, views within views). In most applications the base view will have several children. Assuming that the current template does have children, a step 440 sets the current template equal to the first unprocessed child of the parent template. Thereafter, the processes returns to decision step 424 where the new current template is evaluated to see whether it has any user-defined protos. Thereafter, the process proceeds as described above. If decision step 436 determines that the current template does not have at least one unprocessed child, a decision step 442 determines whether the current template has any after scripts. If it does, these are compiled and executed in a step 444. Next, a decision step 448 determines whether the current template is a user defined proto-template. If so, a step 450 sets the current template equal to the parent template of the user-defined proto-template. Thereafter, process control returns to decision step 424 and the process proceeds as described above. If should be noted that if decision step 442 is answered in the negative, the process moves directly to decision step 448, skipping step 444.

If decision step 448 determines that the current template is not a user-defined proto-template, a decision step 452 determines whether that current template is the base view. If it is, all templates within the application have been processed and the process is completed at 460. If, however, the current template is not the base view, a step 454 sets the current template equal to its parent template. Then, a step 458 determines whether a current template has any unprocessed children. If not, the decision step 442 determines whether the current template contains any after script and the process proceeds from that point. If, on the other hand, decision step 458 determines that the current template does still have unprocessed children, step 440 sets the current template equal to the fist unprocessed child of the parent template. From there, process control returns to decision step 424 where the process continues as discussed above. As can be seen form FIG. 19, the recursive processing of templates continues until all descendants of the base view have been put in a suitable part format. Only after the base view itself has been put in appropriate format is process concluded at 460.

Although many of the processes are diagrammed above in a manner that could imply that the system checks for certain actions by event loops, polling, etc., no such limitation is implied. This format has been employed to emphasize that the invention is, in part, directed to processes or protocols. As is well-known in the art, some object- or frame-based systems do not employ polling. Rather, they use a script or template associated with each function button which is simply activated upon selecting that button. The template then directs the specific action associated with that button; such as displaying dialog boxes, menus, etc. For example, the system might detect a "pen down" event, determine what entity (maybe a view) should receive that event, and send a message (e.g., view clicked) to that view. Further, the drawings often show a sequence of decision steps pertaining to user events, with the steps having a specified order. The actual order may be different from that displayed and may depend only the order in which the user takes certain actions. Thus, the process flow charts provided herein should not be read to imply that the system necessarily checks for user events in the order listed.

While this invention has been described in terms of preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. For example, although the specification describes the "first" and "second" computer systems as separate, the invention can be used in situations where the first and second computer systems are the same computer system. It is therefore intended that the following appended claims include all such alterations, modifications and Permutations as fall within the true spirit and scope of the present invention.

What is claimed is:

1. A method of using a first computer system having a display screen displaying a first graphical user interface to create an application that can be executed and displayed through a second graphical user interface on a second computer system having a display screen sensitive to a pointer, a processor in communication with the display screen, and a memory in communication with the processor such that when the application is executing on the processor it can perform defined actions in response to interaction of the pointer with the display screen, the method comprising the following steps:

displaying a first layout window on the first graphical user interface displayed on the display screen of the first computer system, the first layout window defining a representation of the display screen of the second computer system as it will appear when the application is executing on the second computer system;

displaying a plurality of predefined view as manipulated by a user on the first layout window, each such predefined view defining a graphical interface element appearing on the display screen of the second computer system when the application is executing, the predefined view being located at regions of the first layout window corresponding to the locations of corresponding graphical interface elements appearing on the display screen of the second computer system when the application is executing on the second computer system, the graphical interface elements including one or more of slide bars, buttons, check boxes, icons, menus, and dialog boxes;

linking a second layout window to a predefined view on the first layout window, the second layout window itself having a plurality of predefined views defining graphical interface elements capable of appearing on the display screen of the second computer system when the application is executing; and building said application from views on said first and second layout windows.

2. The method of claim 1 wherein the pointer of the second computer system is a stylus.

3. The method of claim 1 wherein the first and second computer systems are provided on different machines.

4. The method of claim 1 further comprising a step of displaying a palette on the display screen of the first computer system, the palette containing a list of selectable components for preparing views in the first and second layout windows.

5. The method of claim 4 further comprising the steps of:

selecting a linked view component from the palette; and displaying a bounded region defining the linked view in the first layout window, the linked view representing the second layout window, and the bounded region being defined by the interaction of a first computer system pointer with the display screen of the first computer system.

6. The method of claim 1 further comprising the following steps:

defining in the first layout window a button view; and incorporating instructions for opening the views of the second layout when a button represented by the button view is selected from the application.

7. The method of claim 1 further comprising the step of displaying a plurality of bounded regions within the first and second layout windows, such bounded regions corresponding to the locations of said views in the layout windows.

8. A method of using a first computer system having a display screen displaying a first graphical user interface to create an application that can be executed and displayed through a second graphical user interface on a second computer system having a display screen sensitive to a pointer, a processor in communication with the display screen, and a memory in communication with the processor such that when the application is executing on the processor it can perform defined actions in response to interaction of the pointer with the display screen, the method comprising the following steps:

displaying a first layout window on the first graphical user interface displayed on the display screen of the first computer system, the first layout window defining a representation of the display screen of the second computer system as it will appear when the application is executing on the second computer system;

displaying a plurality of predefined views as manipulated by a user on the first layout window, each such predefined view defining a graphical interface element appearing on the display screen of the second computer system when the application is executing, the predefined views being located at regions of the first layout window corresponding to the locations of corresponding graphical interface elements appearing on the display screen of the second computer system when the application is executing on the second computer system, each view representing a template having a plurality of slots defining the structure or behavior of the view;

displaying on the display screen of the first computer system a browser listing the views in the layout window and slots of a selected view, the browser also having a slot editor area displaying a graphical representation of a selected slot from the selected view;

modifying the selected slot in response to editing commands performed on the graphical representation of the selected slot in the slot editor area; and building said application from views on said layout window.

9. The method of claim 8 further comprising a step of adding a new slot to the selected view by selecting the new slot from a list of slots provided in the browser.

10. The method of claim 8 wherein the first and second computer systems are provided on different machines.

11. The method of claim 8 further comprising a step of displaying a palette containing a list of selectable components for use in preparing the views used in the step of displaying a plurality of views on the layout window.

12. The method of claim 8 wherein the step of displaying a plurality of views on the layout window includes a step of displaying at least one view defining a graphical interface element selected from the group consisting of slide bars, buttons, check boxes, icons, menus, and dialog boxes.

13. The method of claim 8 wherein the step of modifying the selected slot in response to editing commands includes a step of adding text to a window, modifying the size of a graphical interface element, or setting flags for a graphical interface element.

14. The method of claim 8 further comprising a step of displaying a plurality of bounded regions within the layout window, each such bounded region corresponding to the location of said views within layout window.

15. The method of claim 8 wherein the slot editor area has a graphical format which is different for different slots of the selected view.

16. A method of using a first computer system having a display screen displaying a first graphical user interface to create an application that can be executed and displayed through a second graphical user interface on a second computer system having a display screen sensitive to a pointer, a processor in communication with the display screen, and a memory in communication with the processor such that when the application is executing on the processor it can perform defined actions in response to interaction of the pointer with the display screen, the method comprising the following steps:

displaying a proto layout window on the display screen of the first computer system, the proto layout window defining a representation of at least a portion of the display screen of the second computer system;

displaying a user-defined arrangement of views on the proto layout window, each such view representing a component available from a palette displayed on the first computer system and each view defining a graphical interface element capable of appearing on the display screen of the second computer system when the application is executing;

displaying a proto template which defines the user-defined arrangement of views on the proto layout window, the proto template corresponding to a collection of graphical interface elements appearing on the display screen of the second computer system when the application is executing, the proto template also being selectable from said palette and functioning as a predefined view;

displaying a main layout window on the first graphical user interface displayed on the display screen of the first computer system, the main layout window defining a representation of the display screen of the second computer system as it will appear when the application is executing on the second computer system;

displaying a view of the proto template on the main layout window on the display screen of the first computer system; and building said application from the views on said main layout window.

17. The method of claim 16 wherein the step of displaying the user-defined arrangement of views on the proto layout window includes displaying a plurality of views which include a representation of at least one arc button which is activatable by interaction with the pointer when the application is executing on the second computer system.

18. The method of claim 17 wherein the buttons are radio buttons.

19. The method of claim 16 wherein the step of displaying the user-defined arrangement of predefined views on the proto layout window includes displaying a plurality of views which include a representation of at least one dialog box when the application is executing on the second computer system.

20. The method of claim 16 wherein the step of displaying a view of the proto template on the main layout window on the display screen of the first computer system includes displaying said view of the proto template on at least two locations of the main layout window such that when executing the application is capable of displaying at least two occurrences of said collection of graphical interface elements.

21. The method of claim 16 wherein the step of displaying a view of the proto template on the main layout window takes place after the proto template has been selected from said palette.

22. The method of claim 16 further comprising a step of displaying a plurality of bounded regions within the proto layout window, each such bounded region corresponding to the location of said predefined views within the proto template.

23. The method of claim 16 wherein the pointer of the second computer system is a stylus.

24. A method of using a first computer system having a display screen displaying a graphical user interface to preparing a package for use in routing files associated with an application to various locations in a second, pointer-based, computer system, the application including a second graphical user interface provided as a hierarchy of views, the method comprising the following steps:

displaying a layout window on the first graphical user interface displayed on the display screen of the first computer system, the layout window defining a representation of a display screen of the second, pointer-based, computer system as it will appear when the application is executing on the second computer system;

displaying a plurality of predefined view as manipulated by a user on the layout window, each such predefined view defining a graphical interface element appearing on the display screen of the second, pointer-based, computer system when the application is executing, the predefined views being located at regions of the layout window corresponding to the locations of corresponding graphical interface elements appearing on the display screen of the second, pointer-based, computer system when the application is executing on the second, pointer-based, computer system;

linking a second layout window to a predefined view on the layout window, the second layout window itself having a plurality of predefined views defining graphical interface elements capable of appearing on the display screen of the second computer system when the application is executing;

building said application from views on said layout window;

identifying files associated with said application from a collection of files;

recursively processing the views from the files associated with said application to form data parts and incorporate the data parts so formed into a package file.

25. The method of claim 24 wherein the step of recursively processing the views includes steps of processing any before and after scripts associated with the view, said before and after scripts defining functions for execution when the application is compiled.

26. The method of claim 24 further comprising a step of processing project data files containing install or remove instructions for the application.

27. The method of claim 24 further comprising steps of incorporating nonapplication data into said package.

28. The method of claim 27 wherein said non-application data are selected from the group consisting of book data, dictionary data, auto data, and soup data.

29. The method of claim 24 wherein the pointer-based computer is a stylus-based computer.

30. The method of claim 24 further comprising processing any before scripts associated with a view before that view is recursively processed.

31. The method of claim 24 further comprising processing any after scripts associated with a view after that view is recursively processed.

* * * * *

(12) EX PARTE REEXAMINATION CERTIFICATE (8976th)
United States Patent
Menendez et al.

(10) Number: US 5,555,369 C1
(45) Certificate Issued: Apr. 24, 2012

(54) METHOD OF CREATING PACKAGES FOR A POINTER-BASED COMPUTER SYSTEM

(75) Inventors: Norberto Menendez, San Jose, CA (US); Peter J. Potrebic, Mountain View, CA (US); Benjamin W. Sharpe, San Francisco, CA (US)

(73) Assignee: Apple Inc., Cupertino, CA (US)

Reexamination Request:
No. 90/010,968, Apr. 28, 2010

Reexamination Certificate for:
Patent No.: 5,555,369
Issued: Sep. 10, 1996
Appl. No.: 08/195,939
Filed: Feb. 14, 1994

(51) Int. Cl.
*G06F 9/44* (2006.01)
*G06F 3/033* (2006.01)

(52) U.S. Cl. .................. 715/762; 715/765; 715/788; 715/810

(58) Field of Classification Search .................. None
See application file for complete search history.

(56) References Cited

To view the complete listing of prior art documents cited during the proceeding for Reexamination Control Number 90/010,968, please refer to the USPTO's public Patent Application Information Retrieval (PAIR) system under the Display References tab.

*Primary Examiner* — Kavita Padmanabhan

(57) ABSTRACT

A development environment and method is provided in which a first computer system is used to develop an application for execution in a second computer system—such as a pen-based computer—having a graphical user interface. The first computer system also has a graphical user interface that can display (1) a palette containing lists and/or buttons of "components" representing graphical interface elements such as slide bars, dialog boxes, buttons, check boxes, icons, menus, etc., (2) a layout window corresponding a display screen of the second computer and containing "views" of selected palette components and (3) a browser allowing the views to be edited graphically. To develop an application, the user creates views on the layout window by (1) selecting a component from the palette and (2) drawing a border for the view in the layout window. Each view so created represents a "template" which is a frame object having a plurality of "slots" which may be edited in a slot editor area of the browser. Some views in the layout window may be "linked views" which point to sublayout windows containing a plurality of other views. Still further, a system is provided that allows the creation of user defined proto templates containing an arrangement of views defined by the user. The user-defined proto templates can be used to create views in the layout window as described above.

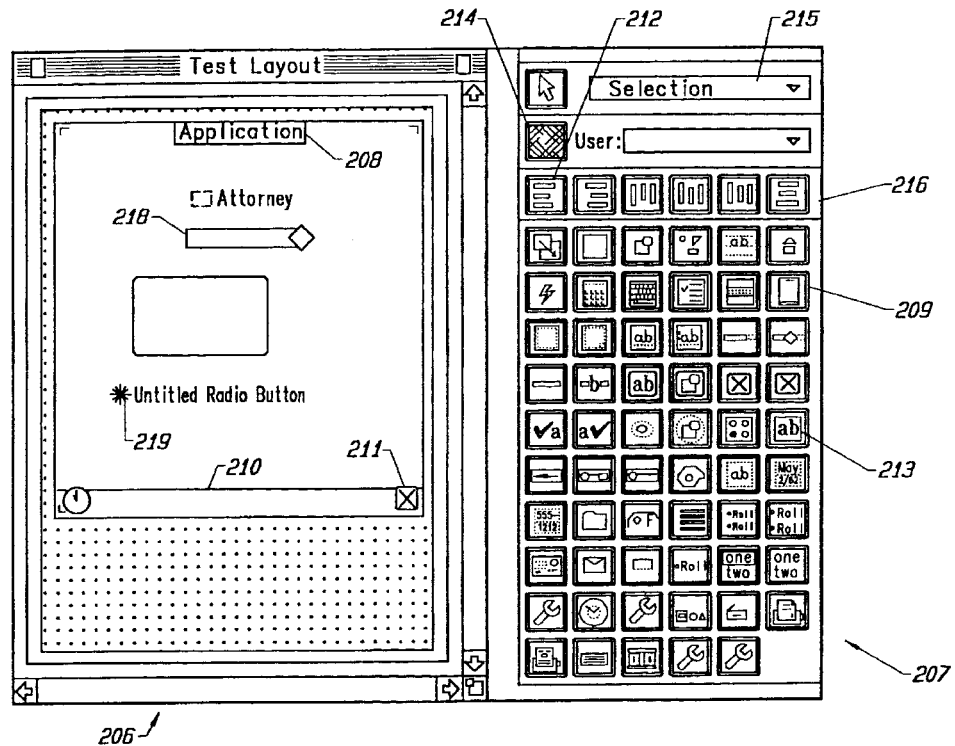

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16-23 is confirmed.

Claims 1-4, 6 and 7 are cancelled.

Claim 8 is determined to be patentable as amended.

Claims 10-15 dependent on an amended claim, are determined to be patentable.

Claims 5, 9 and 24-31 were not reexamined.

8. A method of using a first computer system having a display screen displaying a first graphical user interface to create an application that can be executed and displayed through a second graphical user interface on a second computer system having a display screen sensitive to a pointer, a processor in communication with the display screen, and a memory in communication with the processor such that when the application is executing on the processor it can perform defined actions in response to interaction of the pointer with the display screen, the method comprising the following steps:

displaying a first layout window on the first graphical user interface displayed on the display screen of the first computer system, the first layout window defining a representation of the display screen of the second computer system as it will appear when the application is executing on the second computer system;

displaying a plurality of predefined views as manipulated by a user on the first layout window, each such predefined view defining a graphical interface element appearing on the display screen of the second computer system when the application is executing, the predefined views being located at regions of the first layout window corresponding to the locations of corresponding graphical interface elements appearing on the display screen of the second computer system when the application is executing on the second computer system, each view representing a template having a plurality of slots *collectively capable of defining structure and behavior of the view and each individual slot* defining [the] *a* structure or behavior of the view *wherein the behavior is defined using code*;

displaying on the display screen of the first computer system a browser listing the views in the layout window and slots of a selected view, the browser also having a slot editor area displaying a graphical representation of a selected slot from the selected view;

modifying the selected slot in response to editing commands performed on the graphical representation of the selected slot in the slot editor area; and building said application from views on said layout window.

* * * * *